(12) United States Patent
Yoneda et al.

(10) Patent No.: US 10,699,300 B2
(45) Date of Patent: Jun. 30, 2020

(54) INFORMATION PROVIDING METHOD AND PROGRAM

(71) Applicant: Panasonic Intellectual Property Corporation of America, Torrance, CA (US)

(72) Inventors: Aki Yoneda, Hyogo (JP); Shunji Harada, Osaka (JP); Kouji Miura, Osaka (JP); Tomohiko Kitamura, Osaka (JP); Kozo Nishimura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/023,381

(22) Filed: Jun. 29, 2018

(65) Prior Publication Data
US 2018/0308127 A1  Oct. 25, 2018

Related U.S. Application Data

(63) Continuation of application No. 14/379,550, filed as application No. PCT/JP2013/007333 on Dec. 12, 2013, now Pat. No. 10,043,198.

(30) Foreign Application Priority Data

Dec. 20, 2012  (JP) ................. 2012-278705

(51) Int. Cl.
*G06Q 30/02*  (2012.01)
*A47L 9/28*  (2006.01)
(Continued)

(52) U.S. Cl.
CPC .......... *G06Q 30/0255* (2013.01); *A47J 27/00* (2013.01); *A47L 9/281* (2013.01);
(Continued)

(58) Field of Classification Search
CPC .......................... H05K 7/00; G06Q 30/0255
See application file for complete search history.

(56) References Cited

U.S. PATENT DOCUMENTS 7,885,993 B2  2/2011  Kondo et al.
7,937,486 B2  5/2011  Ohsumi
(Continued)

FOREIGN PATENT DOCUMENTS

JP  2002-291667  10/2002
JP  2003-281006  10/2003
(Continued)

OTHER PUBLICATIONS

"Know Your Target Market", by Elizabeth Wilson. Entrepreneur. Jun. 19, 2009. (Year: 2009).*
(Continued)

*Primary Examiner* — William A Brandenburg
(74) *Attorney, Agent, or Firm* — Wenderoth, Lind & Ponack, LLP

(57) ABSTRACT

Disclosed is an information providing method and so on including: obtaining a use history of a device used by a user for processing on a substance; and providing information according to the obtained use history to the user, wherein the processing on the substance includes a movement of the substance or a change in a temperature of the substance. This allows providing the user of the device with information suitable for the user when the user simply uses a device for doing routine housework, without requiring the user to input information such as search words.

10 Claims, 20 Drawing Sheets

(51) Int. Cl.
*A47J 27/00* (2006.01)
*F25D 29/00* (2006.01)

(52) U.S. Cl.
CPC ........... *A47L 9/2805* (2013.01); *A47L 9/2857* (2013.01); *A47L 9/2894* (2013.01); *F25D 29/00* (2013.01)

(56) References Cited

U.S. PATENT DOCUMENTS

| | | | |
|---|---|---|---|
| 9,429,600 B2* | 8/2016 | Hamouz | G01R 21/00 |
| 2002/0120502 A1* | 8/2002 | Sakaguchi | G06Q 30/02 |
| | | | 705/14.49 |
| 2003/0135539 A1 | 7/2003 | Kondo et al. | |
| 2004/0254810 A1 | 12/2004 | Yamaga et al. | |
| 2006/0184648 A1 | 8/2006 | Ohsumi | |
| 2008/0215662 A1 | 9/2008 | Kondo et al. | |
| 2009/0299896 A1 | 12/2009 | Zhang et al. | |
| 2010/0250059 A1 | 9/2010 | Sekiyama et al. | |
| 2010/0313234 A1 | 12/2010 | Kondo et al. | |
| 2011/0085287 A1* | 4/2011 | Ebrom | G08C 17/02 |
| | | | 361/679.01 |
| 2012/0157106 A1* | 6/2012 | Wang | H04W 24/08 |
| | | | 455/446 |
| 2012/0296909 A1 | 11/2012 | Cao et al. | |
| 2013/0080251 A1 | 3/2013 | Dempski | |
| 2013/0135116 A1 | 5/2013 | Garbe et al. | |
| 2014/0075464 A1* | 3/2014 | McCrea | G06F 19/3418 |
| | | | 725/14 |
| 2015/0019286 A1* | 1/2015 | Harada | G06F 16/285 |
| | | | 705/7.29 |
| 2015/0032505 A1* | 1/2015 | Kusukame | G06Q 30/0201 |
| | | | 705/7.31 |

FOREIGN PATENT DOCUMENTS

| | | |
|---|---|---|
| JP | 2004-355376 | 12/2004 |
| JP | 2006-215867 | 8/2006 |
| JP | 2009-151769 | 7/2009 |
| JP | 2012-58894 | 3/2012 |
| JP | 2012-141658 | 7/2012 |

OTHER PUBLICATIONS

International Search Report dated Mar. 11, 2014 in corresponding International PCT/JP2013/007333.

Koichi Takasugi. et al, "IMS network application that collects vague information of user behavior automatically" IEICE Technical Report, vol. 109, No. 411, Published on Jan. 28, 2010 (with English Abstract).

"About Google Ads" https://support.google.com/ads/, acquired from internet on Jul. 18, 2014.

* cited by examiner

FIG. 10A

| Category | Tendency |
| --- | --- |
| 1 | Big family or Pet owner |
| 2 | Sloppy person or Working person |
| 3 | Living-alone person |
| 4 | Clean-loving person or Organized person |

FIG. 10B

| Category | Tendency |
| --- | --- |
| 1 | Big family |
| 2 | Sloppy person or Working person |
| 3 | Living-alone person or Lazy person or Rich person |
| 4 | Clean-loving person or Organized person |

FIG. 10C

| Category | Tendency |
| --- | --- |
| 1 | Big family |
| 2 | Working person |
| 3 | Eat-out person |
| 4 | Living-alone person and Self-cooking person |

FIG. 10D

| Category | Tendency |
| --- | --- |
| 1 | Big family |
| 2 | Sloppy person |
| 3 | Eat-out person |
| 4 | Living-alone person or Organized person |

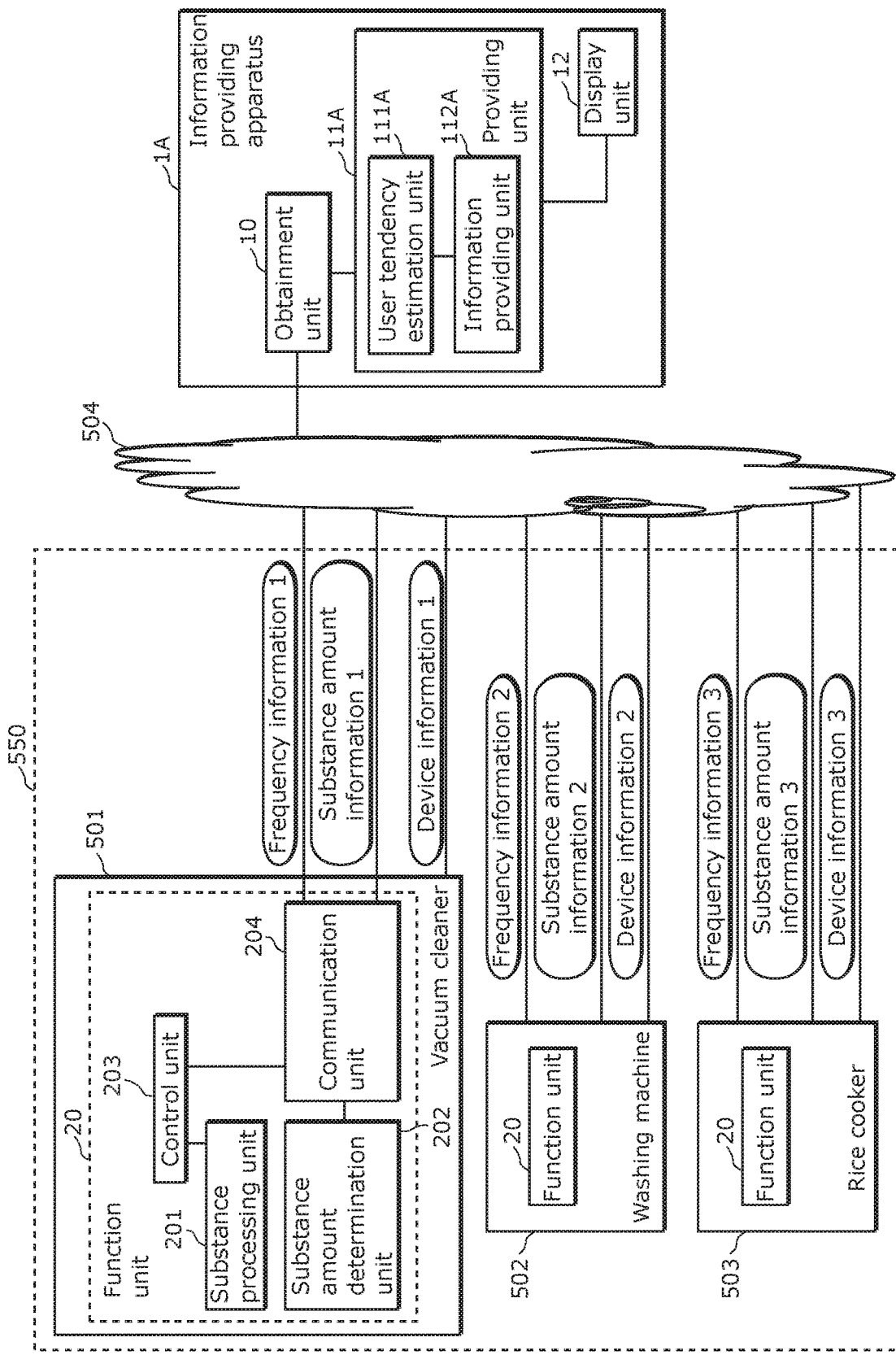

FIG. 12

| Vacuum cleaner | Washing machine | Rice cooker | Refrigerator | Tendency |
|---|---|---|---|---|
| 2 | 2 | 2 | 4 | Working person |
| 2 | 2 | 3 | 2 | Sloppy person |
| 4 | 4 | 4 | 4 | Organized person |
| 1 | 1 | 1 | 1 | Big family |

INFORMATION PROVIDING METHOD AND PROGRAM

TECHNICAL FIELD

The present invention relates to an information providing method and a program.

BACKGROUND ART

For example, Patent Literature (PTL) 1 discloses a system which extracts, via the Internet, TV- and video player-use histories of plural users, accumulates the extracted use histories in a server, and provides information which attracts the users' interest based on the accumulated use histories.

Furthermore, PTL 2 discloses a method of calculating an amount of expended calories through the use of a vacuum cleaner by installing a motion sensor to the head of the vacuum cleaner and measuring a movement distance of the head, and presenting the calculated expended calories to the user.

CITATION LIST

Patent Literature

[PTL 1] Japanese Unexamined Patent Application Publication No. 2009-151769
[PTL 2] Japanese Unexamined Patent Application Publication No. 2002-291667

Non Patent Literature

[NPL 1] "About Google Ads" https://support.google.com/ads

SUMMARY OF INVENTION

Technical Problem

However, with the system disclosed in PTL 1, there is an issue that the use history can be obtained only for the use of devices such as TVs or video players which originally have high relevance to the users' tastes. Furthermore, the method disclosed in PTL 2 merely calculates the calories expended through cleaning.

The present invention has been conceived in view of the above situations, and has an object to provide an information providing method and a program which allow providing information suitable for a user of a device without requiring the user to input information.

Solution to Problem

In order to achieve the above object, an information providing method according to an aspect of the present invention includes: obtaining a use history of a device used by a user for processing on a substance; and providing information according to the obtained use history to the user, wherein the processing on the substance includes a movement of the substance or a change in a temperature of the substance.

It is to be noted that general or specific aspects of the above may be implemented by a system, a method, an integrated circuit, a computer program, or a computer-readable recording medium such as a CD-ROM, and an arbitrary combination of a system, a method, an integrated circuit, a computer program, and a recording medium.

Advantageous Effects of Invention

With the information providing method and so on according to the present invention, information suitable for a user of a device can be provided without requiring the user to input information.

BRIEF DESCRIPTION OF DRAWINGS

FIG. 10A illustrates an example of an estimated tendency of the user in Example according to Embodiment 1.

FIG. 10B illustrates an example of the estimated tendency of the user in Example according to Embodiment 1.

FIG. 10C illustrates an example of the estimated tendency of the user in Example according to Embodiment 1.

FIG. 10D illustrates an example of the estimated tendency of the user in Example according to Embodiment 1.

FIG. 11 is a diagram illustrating a configuration of an information providing system according to Embodiment 2.

FIG. 12 illustrates substance amount information and frequency information in Example according to Embodiment 2.

DESCRIPTION OF EMBODIMENTS

Figure 1:
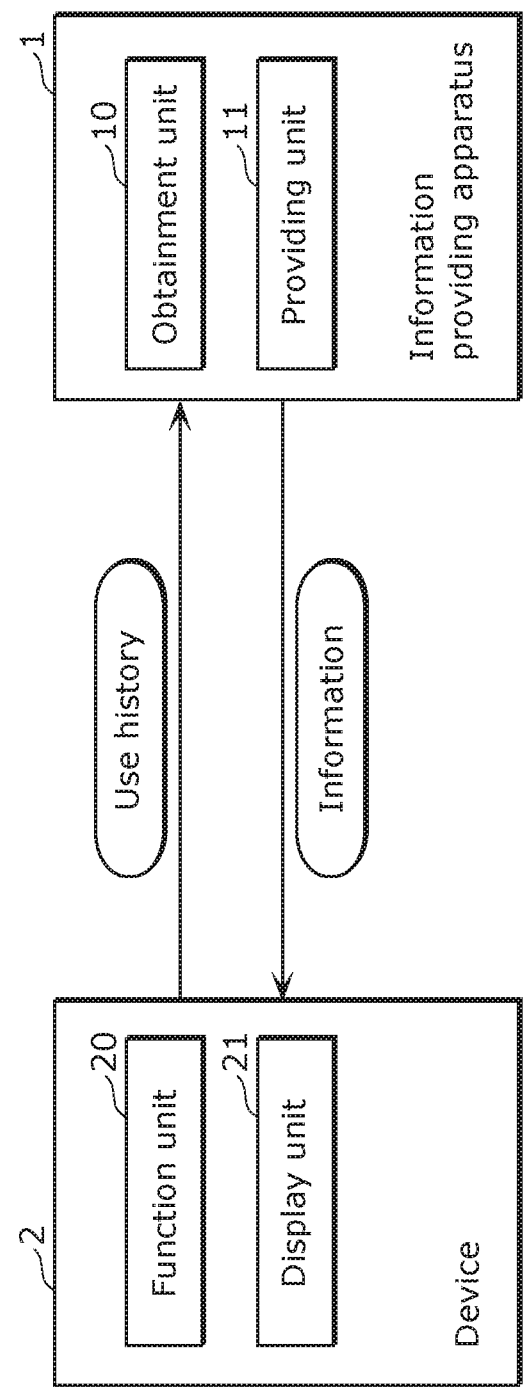
FIG. 1 is a diagram illustrating a configuration of an information providing system according to Embodiment 1.

Background Leading to an Aspect of the Present Invention

Hereinafter description shall be provided on the background leading to an aspect of the present invention.

In the field of information processing using the Internet, recent years have seen a widespread use of a system which estimates a possible desire of a user based on the user's use history and provides the user with a service such as advertisement. For example, in the system disclosed in Non Patent Literature (NPL) 1, which is the "Google (registered trademark) Search Service", the Internet search history of the user or the sentences in the Internet mails transmitted by the user is analyzed, and relevant advertisement is displayed. Such a system enhances the convenience of the user in that an action according to the intended purpose of the user, such as search and e-mail transmission, leads to presentation of attractive information which even the user is not aware of. Furthermore, advertisers expect a significant increase in the advertising effect as compared to the usual advertisement, through the effective presentation of the advertisement of a product which is likely to attract the user's interest. That is to say, both the users and the advertisers benefit from the system. Thus, the importance of the system has increased in recent years.

Currently, however, the use of this system is seen only in the field of information processing using the Internet, and is not spread to other fields. Specifically, non-internet users cannot enjoy the convenience of the system, and the advertisers cannot provide the non-internet users with as effective advertisement as that provided by this system.

The following explains the reason why the use of this system is not spread in fields other than the field of information processing using the Internet. In the fields other than the field of information processing, it is very difficult to obtain information for estimating a tendency, taste, and possible desire of the user, such as history of Internet search keywords and sentences in transmitted e-mails. In other words, the above system can be realized by the user actively creating some sort of sentences and inputting them to an information processing system through Internet search or e-mail transmission. Thus, in daily life where a user does not create sentences, it is difficult to estimate the tendency or desire of the user.

In contrast, PTL 1 discloses a method for estimating the tendency of the user under a situation where the user does not create sentences. In the system disclosed in PTL 1, TV- or video player-use histories of plural users are extracted using the Internet and are accumulated in a server. The use history in this case includes what type of programs (drama, documentary, cartoon, and so on) the user watches often. Then, a user B whose tendency of TV viewing history is similar to the tendency of the TV viewing history of a user A is extracted on the server. Furthermore, the video player use history of the user A and the video player use history of the user B are compared. If there is video content which the user A has viewed but the user B has not viewed, the video content is recommended to the user B.

In the system disclosed in PTL 1, none of the user A and the user B has to create a sentence such as search keyword. The users only make use of the TV and video player according to their preferences. However, their preferences are reflected on the respective use histories. This makes it possible to estimate each user's tendency using the use history, which produces an advantageous effect that attractive information which even the user is not aware of can be provided.

However, the method for estimating the tendency of the user disclosed in PTL 1 has an issue that the method can be applied only to the use of a device which originally has high relevance to the taste, such as a TV or a video player. Specifically, for the use of a device other than the device which originally has high relevance to the taste, such as a vacuum cleaner or a washing machine, the tendency of the user cannot be estimated with the method disclosed in PTL 1. Accordingly, PTL 1 fails to estimate the tendency of the user through the device used for housework, which is done by a lot of people widely and routinely, and to provide information that suits each user.

On the other hand, PTL 2 discloses a method for extracting some sort of information about a user when the user uses a vacuum cleaner. In PTL 2, a motion sensor is installed to a head of the vacuum cleaner and a travel distance of the head is measured, to calculate the calories expended through the use of the vacuum cleaner and present the calculated expended calories to the user. This produces an advantageous effect that the user can be motivated for everyday cleaning.

However, the method disclosed in PTL 2 merely calculates the calories expended through cleaning, and does not estimate the possible desire or tendency of the user. Specifically, PTL 2 also fails to provide information that suits the user by estimating the tendency of the user through the devices used for very routine housework without using a special sentence such as for Internet search and e-mail transmission.

The present invention has been conceived in view of the above situations, and has an object to provide an information providing method which allows providing information suitable for a user of a device without requiring the user to input information such as search word.

In order to achieve the above object, an information providing method according to an aspect of the present invention includes: obtaining a use history of a device used by a user for processing on a substance; and providing information according to the obtained use history to the user, wherein the processing on the substance includes a movement of the substance or a change in a temperature of the substance.

This makes it possible to provide an information providing method which allows providing information suitable for a user of a device without requiring the user to input information such as search word. Specifically, when the user simply uses a device for processing a substance, that is, for doing routine housework, information suitable for the user of the device can be provided without information input by the user.

Furthermore, for example, the information providing method may further include estimating a tendency of the user based on the obtained use history, the tendency including a lifestyle of the user, wherein, in the providing, information according to the estimated tendency of the user may be provided to the user.

Thus, when the user simply uses a device for processing a substance, that is, for doing routine housework, the tendency such as the lifestyle of the user can be estimated from the use history and information suitable for the user can be generated based on the estimated tendency. This allows providing information suitable for the user of the device without requiring the user to input information such as search word.

Here, for example, the tendency of the user may include a character tendency of the user.

Thus, when the user simply uses a device for processing a substance, that is, for doing routine housework, the character tendency of the user can be estimated from the use history when the user simply processes a substance, that is, when the user simply does routine housework and so on. Thus, information suitable for the user can be generated based on the estimated character tendency.

Furthermore, for example, the device may include a plurality of devices of different types, in the obtaining, respective use histories of the devices may be obtained, and in the estimating, the tendency of the user may be estimated based on the obtained respective use histories.

Combining the use histories of the devices as described above allows estimating the tendency of the user with higher accuracy, and thus allows presenting the suitable information according to the estimation result to the user.

Furthermore, for example, in the obtaining, a use history of an other device may be further obtained, the other device being of a same type as the device and being used by an other user, and in the estimating, the tendency of the user may be estimated based on a collection result of the obtained use history of the device and the obtained use history of the other device.

Collecting the use histories output by the devices of the same type as described above allows relatively estimating the tendency of the user, and thus allows presenting suitable information according to the estimation result to the user.

Furthermore, for example, the use history may include substance amount information indicating an amount of the substance processed through the use of the device.

This allows providing information suitable for the user based on the substance amount information included in the use history. For example, when the device is a vacuum cleaner, information prompting the user to clean the room more often or advertisement for a cleaner can be provided to the user based on the average substance amount per week.

Furthermore, for example, the use history may include frequency information indicating a frequency of use of the device by the user.

This allows providing information suitable for the user based on the frequency information included in the use history. When the device is a vacuum cleaner for example, based on the frequency of cleaning per week, information on relevant product that suits the frequency (lifestyle) can be provided to the user.

Furthermore, for example, the use history may include the substance amount information and the frequency information, the substance amount information indicating the amount of the substance processed through the use of the device, the frequency information indicating a frequency of use of the device by the user, and in the providing, information according to a tendency of the user which is estimated according to a combination of the substance amount information and the frequency information may be provided.

This allows estimating the tendency such as the lifestyle of the user based on the combination of the substance amount information and the frequency information which are included in the use history, which allows providing suitable information to the user based on the estimated tendency.

Furthermore, for example, the information may include an advertisement on a product that suits the estimated tendency of the user.

This allows the user to obtain information advantageous for the user according to the user's tendency such as lifestyle. In contrast, the advertisers can enjoy advantageous effect of providing effective advertisement to the user.

Furthermore, for example, the device may be used for housework.

Furthermore, for example, the device may be a vacuum cleaner, and the processing on the substance may be vacuuming dust by the vacuum cleaner.

Furthermore, for example, the device may be a washing machine, and the processing on the substance may be washing an item to be washed by the washing machine.

Furthermore, for example, the device may be a rice cooker, and the processing on the substance may be heating a substance including rice by the rice cooker.

Furthermore, for example, the device may be a refrigerator, and the processing on the substance may be cooling an item to be refrigerated by the refrigerator.

It is to be noted that general or specific aspects of the above may be implemented by a system, a method, an integrated circuit, a computer program, or a computer-readable recording medium such as a CD-ROM, and an arbitrary combination of a system, a method, an integrated circuit, a computer program, and a recording medium.

The following describes the information providing method and so on according to an aspect of the present invention in detail, with reference to the Drawings.

It is to be noted that each of the embodiments described below is a specific example of the present invention. The numerical values, shapes, constituent elements, the arrangement and connection of the constituent elements, steps, the processing order of the steps, etc. shown in the following embodiments are mere examples, and thus do not limit the present invention. Furthermore, out of the constituent elements in the following embodiments, the constituent elements not stated in the independent claims describing the broadest concept of the present invention are described as optional constituent elements.

Embodiment 1

Figure 2:
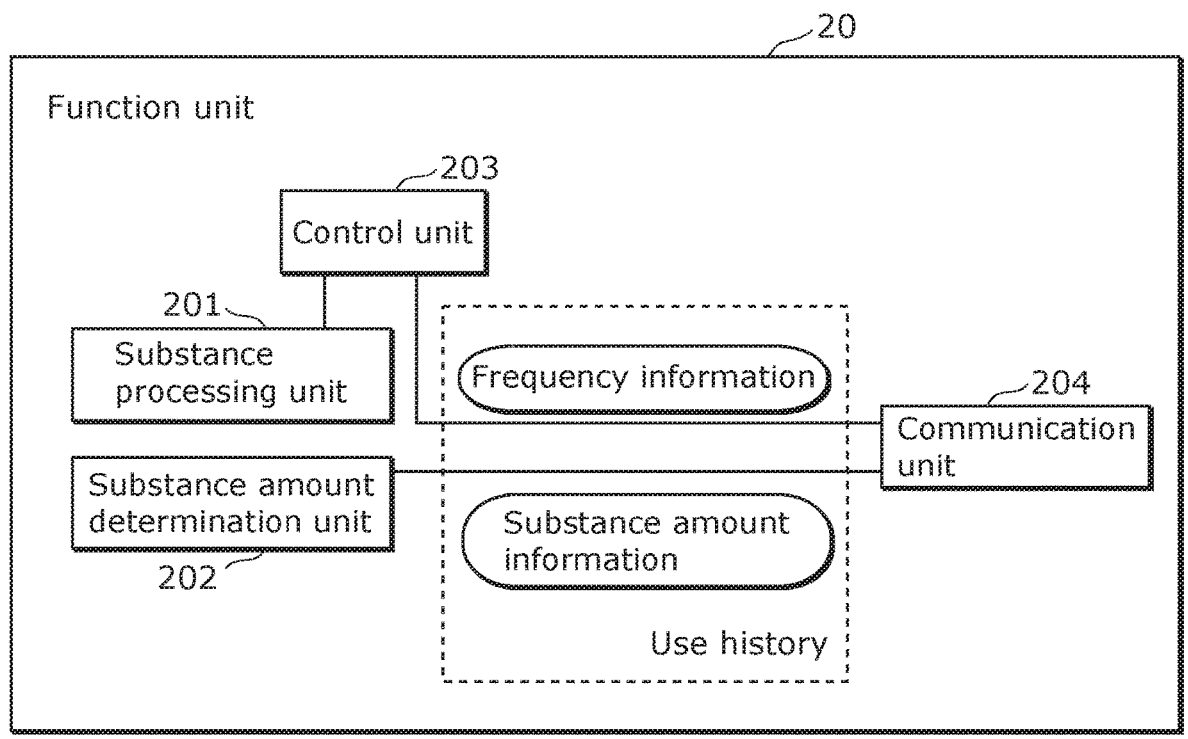
FIG. 2 is a diagram illustrating a detailed function block of a function unit of a device according to Embodiment 1.
Figure 3:
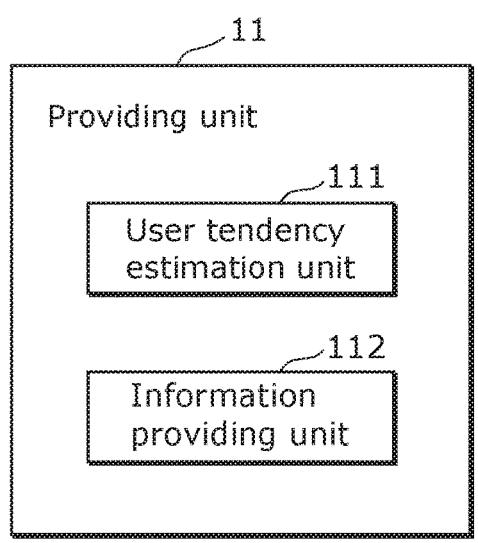
FIG. 3 is a diagram illustrating a detailed function block of a providing unit of an information providing apparatus according to Embodiment 1.

FIG. 1 is a diagram illustrating a configuration of an information providing system according to Embodiment 1. FIG. 2 is a diagram illustrating a detailed function block of a function unit of a device, and FIG. 3 is a diagram illustrating a detailed function block of a providing unit of an information providing apparatus.

In the information providing system in FIG. 1, an information providing apparatus 1 provides information suitable for the user using the obtained use history of the device 2 to the device 2, to provide the information to the user.

[Configuration of Device]

The device 2 in FIG. 1 includes a function unit 20 and a display unit 21, and processes a substance outside of the device 2.

Here, the device 2 is a device for processing on the substance by the user and is used for routine housework by the user. Although the description below is based on an assumption that the device 2 is a device which supports housework at home (so-called white goods), such as a vacuum cleaner, a refrigerator, a washing machine, a rice cooker, and so on, the device 2 is not specifically limited to these white goods. Furthermore, the processing on a substance includes moving the position of the substance and changing the temperature of the substance. Although the details shall be described later, for example: when the device 2 is a vacuum cleaner, the substance is dust in a room and the processing on the substance is vacuuming the dust by the vacuum cleaner; when the device 2 is a washing machine, the substance is the laundry (an item to be washed), and the processing on the substance is washing the laundry by beating the laundry in the water and detergent; when the device 2 is a rice cooker the substance is an item to be cooked including rice, and the processing on the substance is heating the substance including rice; when the device 2 is a refrigerator, the substance is an item to be refrigerated, such as foodstuff stored in the refrigerator, and the processing on the substance is lowering the temperature of the foodstuff, that is cooling the item to be refrigerated. As described above, the device 2 is for processing an item to be processed (substance) outside the device 2 by the user.

The display unit 21 displays the information provided by the information providing apparatus 1. This allows providing the information provided by the information providing apparatus 1 to the user of the device 2.

The function unit 20 transmits, to the information providing apparatus 1, the use history of the device 2 used by the user for processing the substance.

More specifically, the function unit 20 includes a substance processing unit 201, a substance amount determination unit 202, a control unit 203, and a communication unit 204, as shown in FIG. 2.

The substance processing unit 201 has a function for processing a substance outside the device 2.

The substance amount determination unit 202 has a function for determining the amount of substance processed by the substance processing unit 201. Here, when the device 2 is a vacuum cleaner for example, the substance amount determination unit 202 is a dust sensor. A variety of dust sensors are available from the optical one to the one using piezo-electric element. The dust sensor may be implemented by any of these schemes. Furthermore, when the device 2 is a washing machine for example, the substance amount determination unit 202 corresponds to the automatic laundry amount measurement function. Generally, the amount of laundry is measured by rotating the pulsator on a trial basis and using the load current placed on the motor. However, other schemes may be used to measure the amount of laundry. Description on the case where the device 2 is a rice cooker or a refrigerator shall be provided later, and thus the description is omitted here.

After determining the above amount, the substance amount determination unit 202 generates and outputs the substance amount information indicating the amount of the substance in one operation of the device 2. Although the substance amount determination unit 202 outputs the generated substance amount information as the use history to the communication unit 204 in the present embodiment, this is not an only example. The substance amount determination unit 202 may temporarily output the generated substance amount information to a memory (not shown) of the function unit 20, and cause the memory to transmit, per predetermined time period, the substance amount information alone or together with the frequency information described later, as the use history, to the information providing apparatus 1 via the communication unit 204.

The control unit 203 has a function for causing the substance processing unit 201 to operate in response to an instruction, such as switch operation, from the user of the device 2. Furthermore, the control unit 203 includes a clock (not shown), and measures time information such as the time of use of the device 2 by the user, the time and date when the user used the device 2, and the time interval from the last use to the next use of the device 2 by the user. The control unit 203 generates and outputs frequency information indicating the frequency of use of the device 2 by the user, from the measured time information.

Although the control unit 203 outputs the generated frequency information as the use history to the communication unit 204 in the present embodiment, this is not an only example. The control unit 203 may temporarily output the generated frequency information to a memory (not shown) of the function unit 20, and cause the memory to transmit, per predetermined time period, the frequency information alone or together with the substance amount information, as the use history, to the information providing apparatus 1 via the communication unit 204.

The communication unit 204 transmits the input history information to the information providing apparatus 1 sequentially or per predetermined time period. Furthermore, the communication unit 204 receives the information provided by the information providing apparatus 1 and outputs the received information to the display unit 21.

[Configuration of Information Providing Apparatus]

The information providing apparatus 1 in FIG. 1 includes an obtainment unit 10 and a providing unit 11.

The obtainment unit 10 obtains a use history of the device 2 used by the user for processing the substance.

The providing unit 11 provides the user with the information according to the obtained use history. In the present embodiment, the providing unit 11 provides the information according to the obtained use history to the device 2, to provide the information suitable for the user of the device 2 to the user.

More specifically, the providing unit 11 includes a user tendency estimation unit 111 and an information providing unit 112, as illustrated in FIG. 2.

The user tendency estimation unit 111 estimates the tendency, including the lifestyle, of the user based on the obtained use history. Here, the tendency of the user includes the character tendency, in addition to the lifestyle. It is to be noted that the character tendency may be included in the lifestyle.

In the present embodiment, the use history includes the substance amount information indicating the amount of substance processed through the use of the device 2 and the frequency information indicating the frequency of use of the device 2 by the user. The user tendency estimation unit 111 estimates the tendency of the device user based on the combination of the frequency information and the substance amount information. It is to be noted that the details on the estimation method using the combination shall be described later, and thus the description is omitted here.

The information providing unit 112 provides the user with information according to the tendency of the user estimated by the user tendency estimation unit 111. Here, the information provided to the user includes advertisement on a product that suits the estimated tendency of the user. It is sufficient that this information is suitable information according to the estimation result (information optimized for the user), and thus is not limited to the advertisement on a product. For example, this information may be information relevant to the device 2, and may be general information that is not relevant to the device 2 and is likely to attract the interest of the user determined from the tendency of the user.

[Operation of Information Providing System]

Next, description shall be provided on an operation performed by the information providing system having the above configuration.

Figure 4:
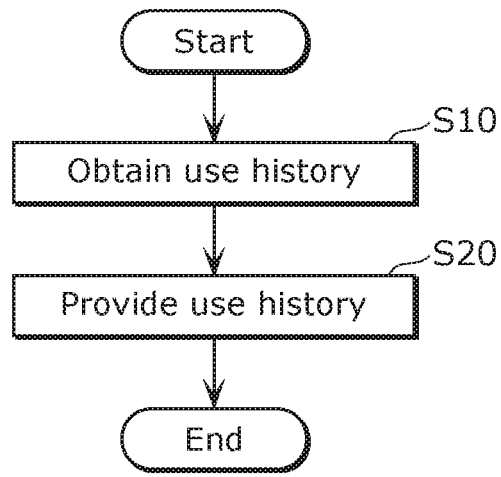
FIG. 4 is a flowchart illustrating an information providing method according to Embodiment 1.
Figure 5:
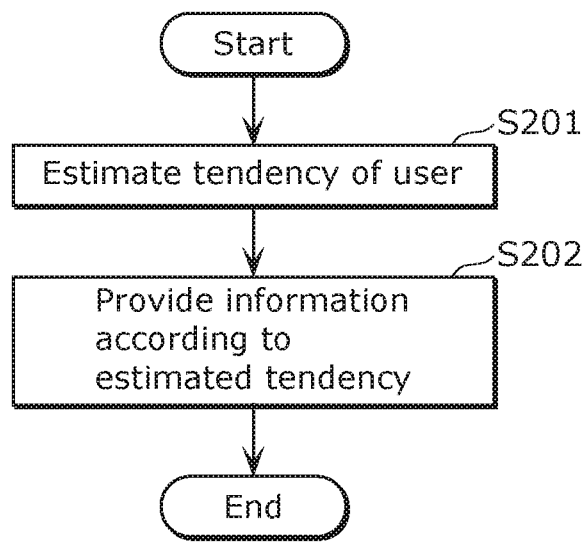
FIG. 5 is a flowchart illustrating the details of S20 in FIG. 4.

FIG. 4 is a flowchart illustrating an information providing method according to Embodiment 1. FIG. 5 is a flowchart illustrating the details of S20 in FIG. 4.

It is assumed that the user regularly processes substance, that is cleans dust and cooks rice, using the device 2. Description shall be provided on the operation performed by the information providing system in such a situation.

Firstly, the information providing apparatus 1 obtains the use history of the device 2 (510).

Next, the information providing apparatus 1 provides the user with information according to the obtained use history (S20). More specifically, as shown in FIG. 5, the information providing apparatus 1 first estimates the tendency, including the lifestyle, of the user (S201). Then, the information providing apparatus 1 provides the user (the device 2) with information according to the estimated tendency of the user.

[Advantageous Effect]

In the above manner, the information providing system can provide information suitable for the user, using the obtained use history of the device 2.

Figure 6:
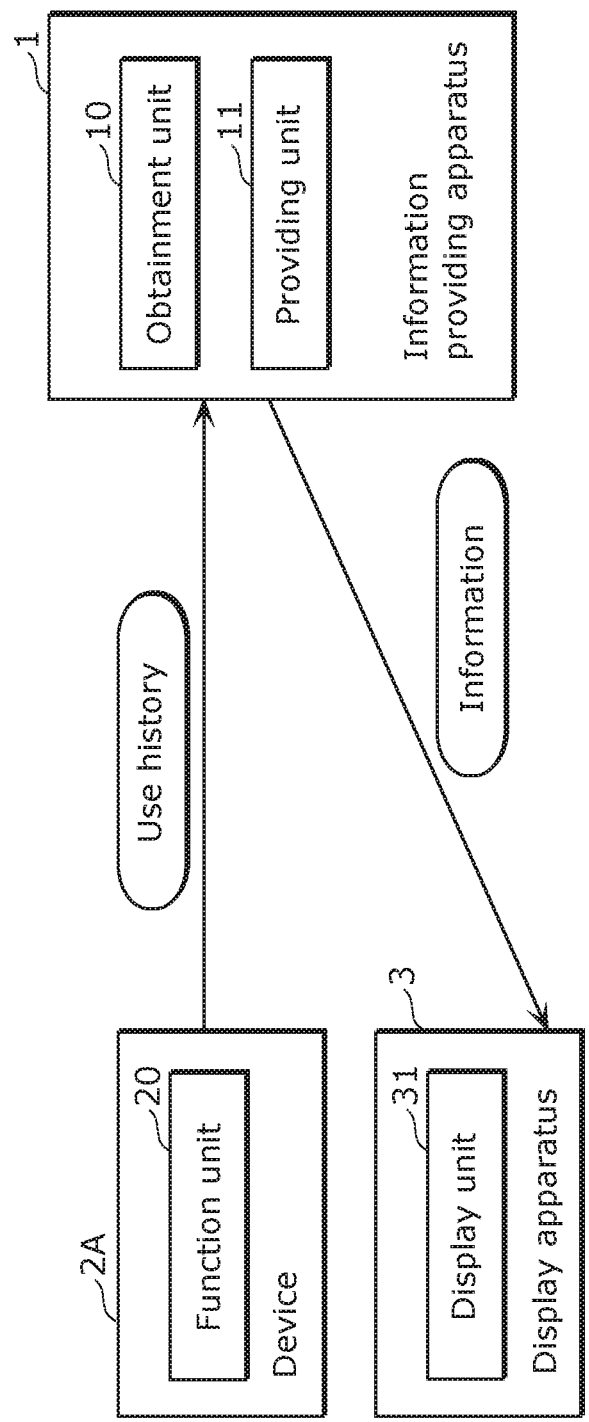
FIG. 6 is a diagram illustrating another configuration of the information providing system according to Embodiment 1.
Figure 7:
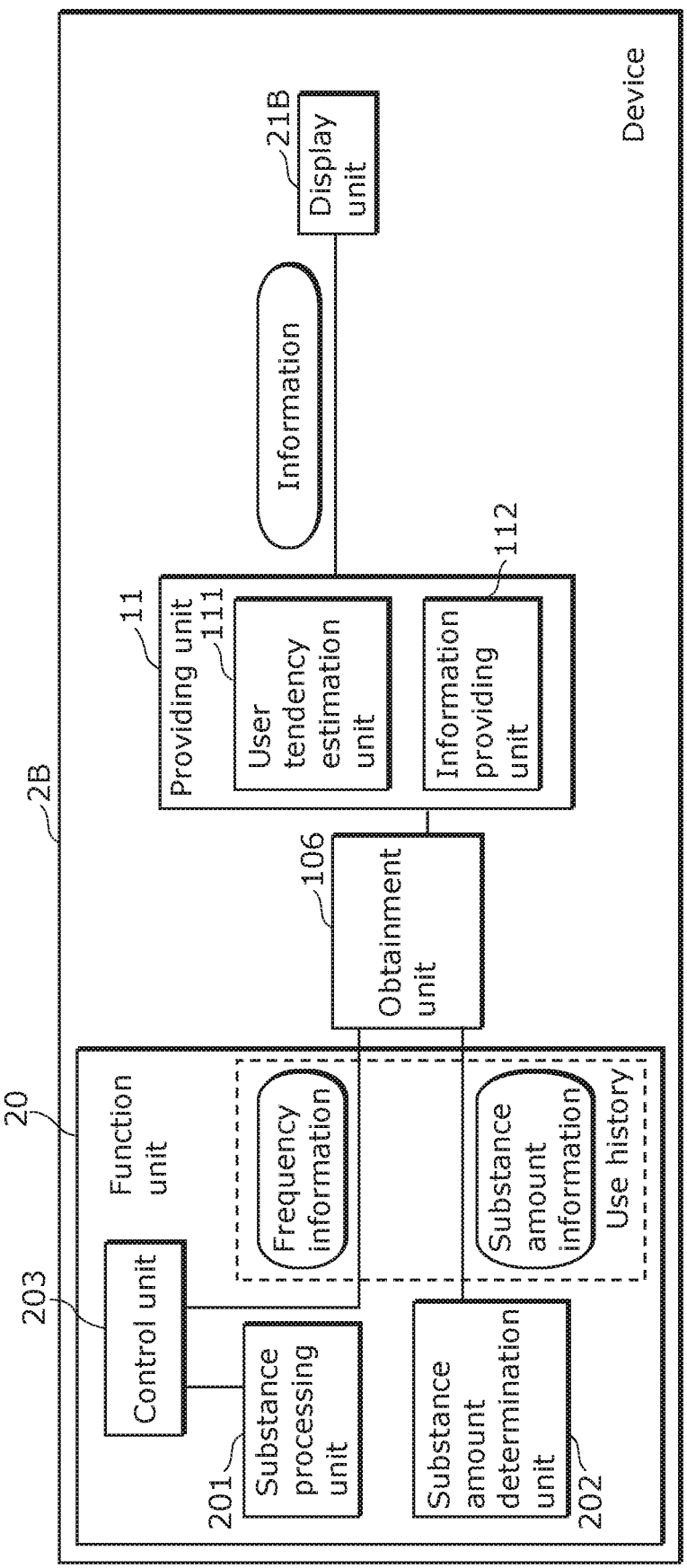
FIG. 7 is a diagram illustrating another configuration of the device according to Embodiment 1.

It is to be noted that the information providing system does not necessarily have the configuration illustrated in FIG. 1 above. For example, as illustrated in FIG. 6, a device 2A may not have the display unit. In this case, it is sufficient that the information providing apparatus 1 provides information according to the estimated tendency of the user to a display unit 31 of a display apparatus 3 such as a TV. Furthermore, as illustrated in FIG. 7 for example, a device 2B may include a function of the information providing apparatus 1. In this case, it is sufficient that the information according to the tendency of the user estimated through the function of the information providing apparatus 1 is displayed on a display unit 213. FIG. 6 illustrates another configuration of the information providing system according to Embodiment 1, and FIG. 7 illustrates another configuration of the device according to Embodiment 1.

Example

Hereinafter, description shall be provided on an example of a specific operation in an information providing method.

Each of FIG. 8A to FIG. 8D is a diagram illustrating the substance amount information and the frequency information in Example according to Embodiment 1.

Figure 8A:
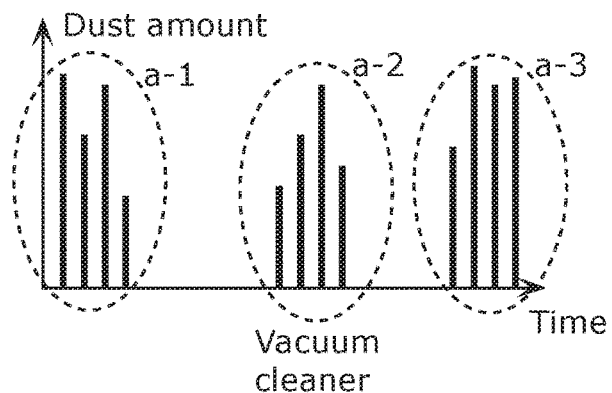
FIG. 8A is a diagram illustrating substance amount information and frequency information in Example according to Embodiment 1.

FIG. 8A illustrates a course of calculation of the substance amount information and the frequency information when the device 2 is a vacuum cleaner. The horizontal axis indicates time and the vertical axis indicates an amount of dust detected by the dust sensor of the vacuum cleaner.

It is assumed that the following operations are repeated in cleaning using a vacuum cleaner: turning the switch on and vacuuming dust, turning the switch off and moving to another room, and turning the switch on again and vacuuming dust. Once the cleaning is finished, the switch is kept turned off for a while until the next cleaning. FIG. 8A represents the above operations. More specifically, in FIG. 8A, the line in the vertical direction (hereinafter referred to as the vertical line) represents the amount of dust vacuumed from when the switch is turned on to when the switch is turned off. Each of the groups of vertical lines in the dashed areas a-1, a-2, and a-3 indicates the repetition of turning On/Off of the switch of the vacuum cleaner and the amount of dust vacuumed every time the switch is turned on in one cleaning.

Thus, the sum of each group of vertical lines in the dashed areas a-1, a-2, and a-3 corresponds to the amount of dust processed in one cleaning. Thus, the average value of the processed amounts is used as the substance amount information indicating the amount of substance processed through the use of the vacuum cleaner. The temporal intervals (intervals in the horizontal axis) between the groups of vertical lines in the dashed areas a-1, a-2, and a-3 are used as the number of cleaning per unit time, that is, the frequency information. It is to be noted that any unit may be set for the frequency information. For example, the number of cleaning per week and an average time taken from the last cleaning to the next cleaning may be used.

Figure 8B:
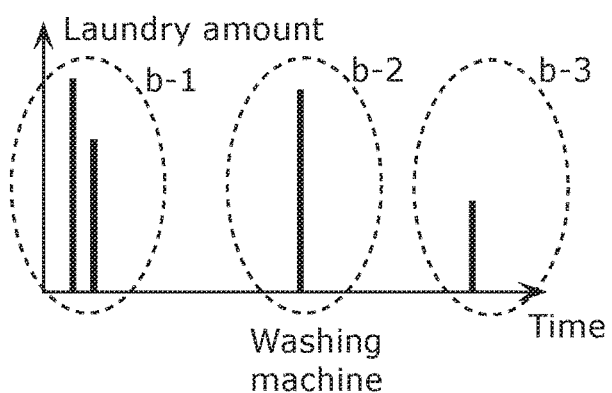
FIG. 8B is a diagram illustrating the substance amount information and the frequency information in Example according to Embodiment 1.

FIG. 8B illustrates a course of calculation of the substance amount information and the frequency information when the device 2 is a washing machine. The horizontal axis represents time, and the vertical axis represents the amount of laundry detected by the motor of the washing machine. When the amount of laundry is within the capacity of the washing machine, it is enough to do the laundry once. However, when amount of laundry is beyond the capacity, it is likely that the laundry is done two times or more. FIG. 8B represents such an operation. More specifically, in FIG. 8A, the vertical line represents the amount of laundry in one operation of the washing machine. Each of the groups of vertical lines in the dashed areas b-1, b-2, and b-3 indicates the repetition of initiation and termination of the operation of the washing machine in one laundry and the amount of laundry (amount of an item to be washed) washed using the washing machine.

Thus, the sum of each group of vertical lines in the dashed areas b-1, b-2, and b-3 corresponds to the amount of laundry (amount of the item to be washed) washed by the user in one laundry. Thus, the average value of these amounts is used as the substance amount information indicating the amount of substance processed though the used of the washing machine. Furthermore, the temporal intervals (intervals in the horizontal axis) between the groups of vertical lines in the dashed areas b-1, b-2, and b-3 are used as the number of laundry per unit time, that is, the frequency information. Here, any unit may be set for the frequency information, in the same manner as the above.

Figure 8C:
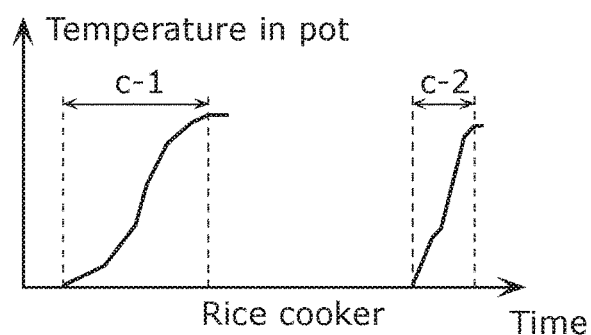
FIG. 8C is a diagram illustrating the substance amount information and the frequency information in Example according to Embodiment 1.

FIG. 8C is a diagram for illustrating a course of calculation of the substance amount information and the frequency information when the device 2 is a rice cooker. The horizontal axis represents the time, and the vertical axis represents the temperature in the pot of the rice cooker.

In the present example, regardless of the amount of rice, the time (time c-1 and time c-2) taken until the temperature reaches the boiling temperature (approximately 100 Celsius) when supplied with certain heat is measured, and the measured time is calculated as the amount of rice which is the item to be processed. Specifically, the average value of the time c-1 and the time c-2 is used as the substance amount information indicating the amount of substance processed through the use of the rice cooker. The temporal intervals between the measured time c-1 and c-2 at which the processing on the substance is occurred is used as the number of cooking of rice per unit time, that is, the frequency information. Again, any unit may be set for the frequency information, in the same manner as the above.

Although the elapsed time until boiling is used as the substance amount information for the rice cooker in the present embodiment, this is not an only example. The substance amount information may be calculated using a scheme for detecting the physical amount changing according to the amount of rice when cooking is started. For example, the substance amount information may be calculated by measuring: the weight of the inner pot when cooking is started; the amount of steam that is generated; or the steam pressure.

Figure 8D:
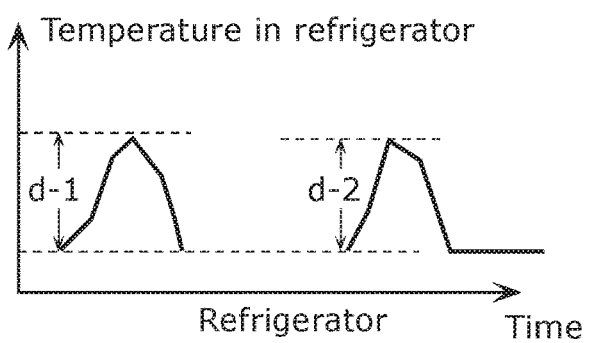
FIG. 8D is a diagram illustrating the substance amount information and the frequency information in Example according to Embodiment 1.

FIG. 8D is a diagram for illustrating a course of calculation of the substance amount information and the frequency information when the device 2 is a refrigerator. The horizontal axis represents time, and the vertical axis represents the temperature in the refrigerator.

In the present example, the temperature rise (difference d-1 and difference d-2, for example) in the refrigerator caused by opening of the door for one time is measured, and the measured temperature rise is calculated as an amount of foodstuff which is an item to be processed. This is because, when some foodstuff at room temperature is put into the refrigerator, the temperature in the refrigerator is supposed to rise according to the amount. Specifically, the average value of the difference d-1 and the difference d-2 is used as the substance amount information indicating the amount of substance processed through the use of the refrigerator. The temporal intervals between door openings are used as the frequency information. Again, any unit may be set for the frequency information, in the same manner as the above.

Although it has been described that the temperature rise in the refrigerator caused by one door-opening is used as the substance amount information for the refrigerator in the present example, this is not an only example. The substance amount information may be calculated using a scheme for detecting the physical amount changing according to the amount of foodstuff taken out from and put into the refrigerator. For example, the substance amount information may be calculated by measuring the weight change in the refrigerator or the time taken until the refrigerator is cooled to the set temperature. Furthermore, the substance amount information may be calculated by measuring the electric power used for cooling, or by observing the amount of foodstuff taken out from and put into the refrigerator using a camera installed in the refrigerator, for example.

Figure 9:
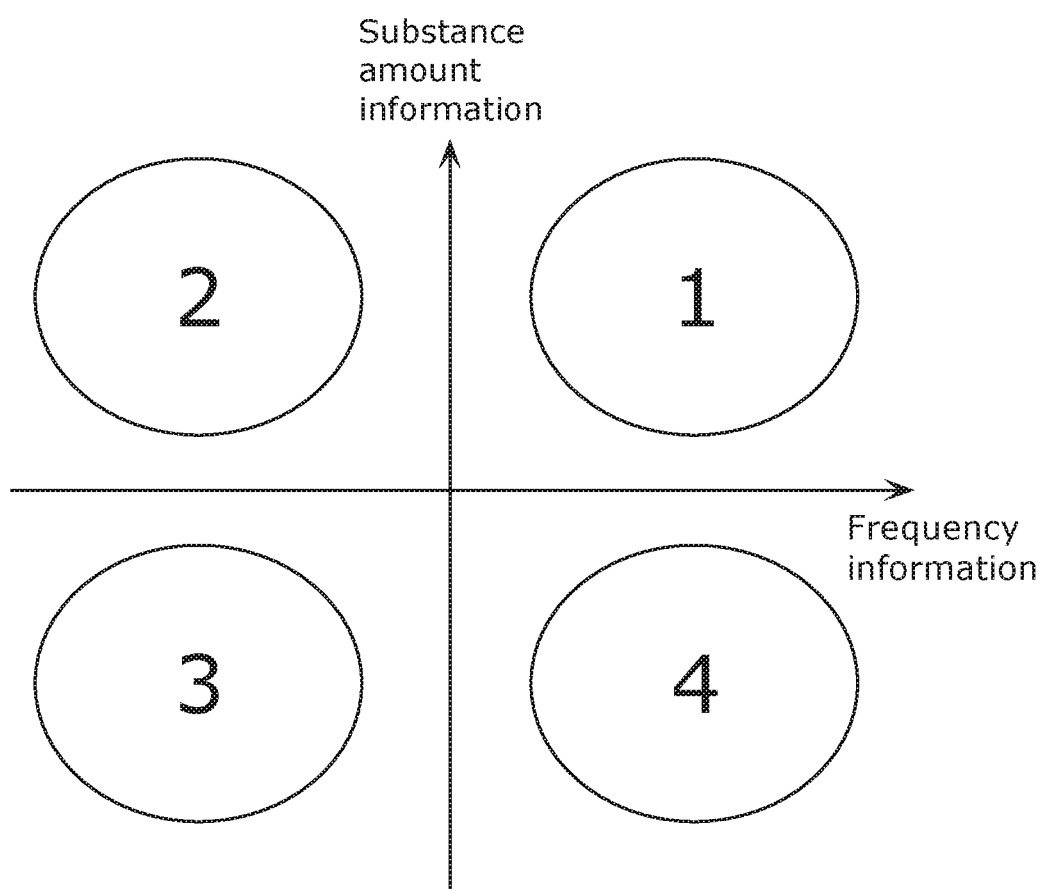
FIG. 9 is a four-quadrant diagram for estimating a tendency of a user in Example according to Embodiment 1.

Next, description shall be provided on a course of estimation of the tendency of the user using the substance amount information and the frequency information obtained in the above manner. FIG. 9 is a four-quadrant diagram for estimating a tendency of a user in Example according to Embodiment 1. In the present example, the frequency information is indicated along the horizontal axis and the substance amount information is indicated along the vertical axis. Points plotted based on the obtained substance amount information and the frequency information are categorized into four quadrants, using a threshold preset according to a type of the device 2, such as the vacuum cleaner, the washing machine, and so on. The categorization result is used to estimate the tendency of the user.

FIG. 10A to FIG. 10D each indicates an example of the estimated tendency of the user. The number indicated under "category" in the Drawing represents the order of the quadrant in FIG. 9.

FIG. 10A indicates an example of the estimated tendency of the user when the device 2 is a vacuum cleaner. The tendency of the user is estimated for the following reasons. Specifically, when the device 2 is a vacuum cleaner, it is assumed that the first quadrant in FIG. 9 indicates that the frequency of cleaning is high and the amount of dust per cleaning is large. This leads to an assumption that the user who does the cleaning in such a manner has a big family or a pet, and thus the amount of dust is large. In contrast, the second quadrant indicates that the frequency of cleaning is low but the amount of dust per cleaning is large. From this situation, it can be estimated that the user has a sloppy character and does not do the cleaning frequently but collectively, or is a working person who can do the cleaning only on weekends. The third quadrant indicates that the frequency of cleaning is low and the amount of dust is small, which leads to an estimation that the user is frugal, living on his/her own with no pet and living a lonely life. The fourth quadrant indicates that the frequency of cleaning is high and the amount of dust is small. This leads to estimation that the user has a tendency of having an organized character or clean-loving character.

Although the tendency of the user is estimated using the substance amount information and the frequency information in the present embodiment, the user tendency estimation method is not limited to the above method.

For example, the history on the date of cleaning may be checked. If the date of cleaning is always Saturdays or Sundays, it can be assumed that the user plotted to the second quadrant is not just a sloppy person but is a working person who can do the cleaning only on weekends.

Another example is to use other information detected by the vacuum cleaner. For example, when a smell sensor is available and the type of dust can be determined, it is possible to estimate whether the user has a pet or a big family. Moreover, when a movement distance of the vacuum cleaner can be measured (by the number of rotations of wheels, an acceleration sensor, a GPS, and so on), the range of cleaning of the house, that is the floor area, can be found. This allows estimating whether the user lives in an apartment or a house. Moreover, when information from an altitude sensor (a GPS, a barometer, etc.) can be used, it is possible to estimate whether the home is a two-story house or an apartment. Furthermore, when a microphone is installed to the vacuum cleaner and the speed of the vacuum cleaner's noise, which reflects off the wall and returns, can be measured, the area of a room can be also estimated. The information which allows estimating the user's living environment and the economical circumstance which forms the basis for the living environment is very important in providing the user with optimal information, especially advertisement.

Furthermore, information on the movement distance of the head of the vacuum cleaner and the angular variation (measured by an acceleration sensor or a geomagnetic sensor) may also be used. Such information can be used for estimating whether the user is rotating the head frequently along the corners of the room, that is whether the user is good at cleaning or not or has an organized character or a sloppy character.

Furthermore, information on how many times the user changed the head of the vacuum cleaner (from a regular head to a head for cleaning narrow space) may also be used. Such information can be used for estimating whether the user do the cleaning frequently or is sloppy.

Furthermore, information from a pressure sensor or an optical sensor installed to the head portion or information on the variation in the amount of dust vacuumed per time unit may also be used. Use of such information allows estimating whether the floor is a wooden floor, straw-mat floor, or carpet floor. Such information can be used for providing information optimum to the user since it allows estimating the lifestyle (Japanese style or Western style) of the user.

FIG. 10B indicates an example of the estimated tendency of the user when the device 2 is a washing machine. The tendency of the user is estimated for the following reasons. Specifically, when the device 2 is a washing machine, it is assumed that the first quadrant in FIG. 9 indicates that the frequency of washing is high and the amount of laundry per washing is large. Accordingly, it can be estimated that the user who does the laundry in this manner has a big family. In contrast, the second quadrant indicates that the frequency of washing is low but the amount of laundry per washing is large. From this situation, it can be estimated that the user has a sloppy character and does not do the washing frequently but collectively, or is a working person who can do the washing only on weekends. The third quadrant indicates that the frequently of washing is low and the amount of laundry is small. Thus, it can be estimated that the user is a frugal person living alone, a lazy person who does not wash clothes often, or a rich person who uses a cleaner's service for laundry. The fourth quadrant indicates that the frequency of washing is high and the amount of laundry per washing is small. This leads to estimation that the user has a tendency of having an organized character or clean-loving character.

Although the tendency of the user is estimated using the substance amount information and the frequency information in the present embodiment, the user tendency estimation method is not limited to the above method.

For example, the history on the date of washing may be checked. If the date of washing is always Saturdays or Sundays, it is likely that the user plotted to the second quadrant is not just a sloppy person but is a working person who can do the washing only on weekends.

Furthermore, other information detected by the washing machine may be used. For example, when the type of dirt can be determined by a dirt sensor and so on, it is possible to estimate the occupation of the user. Furthermore, if the tendency regarding the selection of the course of washing can be determined, that is when it can be determined that the user selects a hand-wash course more often than a standard course for example, it can be estimated that the user has a tendency of having fine or delicate clothes and thus of being fashionable.

FIG. 10C indicates an example of the estimated tendency of the user when the device 2 is a rice cooker. The tendency of the user is estimated for the following reasons. Specifically, when the device 2 is a rice cooker, it is assumed that the first quadrant in FIG. 9 indicates that the frequency of cooking rice is high and the amount of rice per cooking is large. Accordingly, it can be estimated that the user who cooks rice in such a manner has a big family. In contrast, the second quadrant indicates that the frequency of cooking rice is low but the amount of rice per cooking is large. From this situation, the tendency of the user can be estimated that the user is a working person, cooks rice collectively, and freezes and stores the cooked rice. The third quadrant indicates that the frequency of cooking rice is low and the amount of rice per cooking is small. Thus, the tendency of the user can be estimated that the user does not cook meals very often and is mainly an eat-out person. It can be assumed that the fourth quadrant indicates that the frequency of cooking rice is high and the amount of rice per cooking is small. This leads to an estimation of the user's tendency that the user is living alone and is a self-cooking person.

Although the tendency of the user is estimated using the substance amount information and the frequency information in the present embodiment, the user tendency estimation method is not limited to the above method.

For example, the history on the date of cooking rice may be checked. If the date of cooking rice is always Saturdays or Sundays, it can be assumed that the user plotted to the second quadrant is a working person who can cook rice only on weekends.

Other information detected by the rice cooker may be used. For example, if the user selects a course for cooking brown rice more often than a standard course, it can be estimated that the user has a tendency of taking care of health.

FIG. 10D indicates an example of the estimated tendency of the user when the device 2 is a refrigerator. The tendency of the user is estimated for the following reasons. Specifically, when the device 2 is a refrigerator, it is assumed that the first quadrant in FIG. 9 indicates that the frequency of door-opening is high and the temperature rise in the refrigerator per door-opening is great. Accordingly, the user's tendency can be estimated that the user has a big family where the amount of foodstuff taken out from and put into the refrigerator is large. In contrast, the second quadrant indicates that the frequency of door-opening is low but the temperature rise in the refrigerator per door-opening is great. From this situation, the user's tendency can be estimated that the user has a sloppy character and selects a variety of foodstuffs with the refrigerator opened. The third quadrant indicates that the frequency of door-opening is low and the temperature rise in the refrigerator per door-opening is not great. From this situation, the user's tendency can be estimated that the user mainly eats out and the amount of foodstuff in the refrigerator is small in the first place. The fourth quadrant indicates that the frequency of door-opening is high but the temperature rise in the refrigerator per door-opening is not great. From this situation, the user's tendency can be estimated that the user has an organized character and closes the door frequently, living alone, and the amount of foodstuff is small.

Although the tendency of the user is estimated using the substance amount information and the frequency information in the present embodiment, the user tendency estimation method is not limited to the above method.

For example, the history on the date or time of door-opening may be checked. If the user rarely opens the door in day time on weekdays and opens the door in day time on Saturdays or Sundays, the user's tendency can be estimated that the user is a working person.

Other information detectable by the refrigerator may be used. For example, when the distribution of foodstuff in the refrigerator can be determined from the weight, etc., the user's lifestyle (tendency) can be estimated such as whether the user cooks meals on a daily basis or mainly eats frozen food, based on the information on which of the freezing chamber and the refrigerating chamber contains the larger amount of foodstuff.

[Advantageous Effect]

As described above, with the present embodiment, the tendency of the user can be estimated through routine housework using home appliances, and suitable information according to the estimation result can be presented to the user. Details of information presentation shall be described later.

More specifically, with the present embodiment, a significant advantageous effect can be produced that is the user can obtain suitable information which is likely to attract the user's interest without creating special sentences, such as search words or e-mails, and the advertiser can provide effective advertisement.

For example, assume that the device 2 is a vacuum cleaner, the substance amount information is the amount of dust vacuumed by the vacuum cleaner per cleaning, and the frequency information is the number of use of the vacuum cleaner per week. In this case, the tendency, that is the character or lifestyle, of the user for the use of the vacuum cleaner can be estimated based on the combination of the amount of dust per cleaning and the number of use of the vacuum cleaner per week. For example, if the amount of dust per cleaning is large and the user does the cleaning only once a week, it can be estimated that the user has a sloppy character and does not do the cleaning very often, and a tendency can be estimated that the user is a working person who can do the housework only on weekends.

Furthermore, if the amount of dust per cleaning is small and the user does the cleaning every day, a tendency can be estimated that the user has a clean-loving character and does the cleaning frequently. The information, such as advertisement, that suits the tendency of the user is provided according to the estimated tendency.

Although home appliances such as the vacuum cleaner, the washing machine, the rice cooker, or the refrigerator was used as the device 2 for the description in the present embodiment, the device 2 is not limited to these home appliances. For example, the device 2 may be cooking equipment such as a microwave, an oven, a food processor, a mixer, an induction heater (IH) stove, or the like. Furthermore, the frequency of heating a bath or time for which the water in the bath is kept warm may be used. In other words, the device 2 is not limited to home appliances and may be anything through which the method described in the present embodiment can be implemented.

Embodiment 2

In Embodiment 2, description shall be provided on a case where the information providing apparatus obtains use histories from plural devices of different types, and estimates the tendency of the user.

FIG. 11 is a diagram illustrating a configuration of an information providing system according to Embodiment 2. It is to be noted that the same constituents as those in FIG. 1 are assigned with the same numerals, and the detailed description is omitted.

The information providing system indicated in FIG. 11 includes an information providing apparatus 1A, a vacuum cleaner 501, a washing machine 502, and a rice cooker 503 which are connected via a network 504.

[Configuration of Device]

The vacuum cleaner 501, the washing machine 502, and the rice cooker 503 in FIG. 11 correspond to the specific examples of the device 2 in Embodiment 1, and are home appliances used in a single home, that is home 550. The vacuum cleaner 501, the washing machine 502, and the rice cooker 503 each includes the function unit 20, and outputs the frequency information and the substance amount information which are the use history described in Embodiment 1.

In the present embodiment, the vacuum cleaner 501, the washing machine 502, and the rice cooker 503 further output device information for identifying the type of itself (device information 1, device information 2, and device information 3, respectively). Such device information is associated with the respective devices (the vacuum cleaner 501, the washing machine 502, and the rice cooker 503), and allows identifying from which device the substance amount information and the frequency information are outputted.

The network 504 connects the vacuum cleaner 501, the washing machine 502, and the rice cooker 503 with the information providing apparatus 1A, and transmits the frequency information items, the substance amount information items, and the device information items outputted from the vacuum cleaner 501, the washing machine 502, and the rice cooker 503 to the information providing apparatus 1A. Here, the network 504 is implemented by a domestic LAN and is a wireless LAN, for example.

[Configuration of Information Providing Apparatus]

The information providing apparatus 1A shown in FIG. 11 includes a providing unit 11A having a different configuration from that of the information providing apparatus 1 in Embodiment 1, and further includes a display unit 12.

In the present embodiment, the information providing apparatus 1A is implemented to a server outside the home 550, obtains the use histories from the devices 2 (the vacuum cleaner 501, the washing machine 502, and the rice cooker 503) via a gateway connected to the network 504, and provides the information suitable for the user to the device 2 using the obtained use histories. It is to be noted that the information providing apparatus 1A may be implemented as a server inside the home 550 or may be embedded to a TV in the home 550. The information providing apparatus 1A may be embedded to the device 2, namely the vacuum cleaner 501, the washing machine 502, or the rice cooker 503, as noted in Embodiment 1.

The obtainment unit 10 obtains the use histories of the respective devices of different types. Specifically, the obtainment unit 10 obtains the use histories (frequency information items and substance amount information items) and the device information items outputted by the devices 2 of different types (the vacuum cleaner 501, the washing machine 502, and the rice cooker 503).

The user tendency estimation unit 111A estimates the tendency of the user based on the respective use histories obtained by the obtainment unit 10. More specifically, the user tendency estimation unit 111A estimates the tendency of the user for the devices 2 of different types (the vacuum cleaner 501, the washing machine 502, and the rice cooker 503), based on the use histories (frequency information items and substance amount information items) and the types of the devices 2 designated by the device information items.

The information providing unit 112A provides the information according to the tendency of the user estimated by the user tendency estimation unit 111A to the display unit 12.

The display unit 12 displays the information provided by the information providing apparatus 112A. This allows the information providing apparatus 1A to provide the user with the information according to the tendency of the user estimated by the user tendency estimation unit 111A.

Example

FIG. 12 illustrates an example of the estimated tendency of the user in Example according to Embodiment 2. FIG. 12 indicates an example of the tendency of the user estimated by combining the substance amount information and the frequency information of two different devices 2, and the figure in the table in FIG. 12 represents the order of quadrant indicated in FIG. 9.

The user tendency estimation unit 111A estimates the tendency of the user as shown in FIG. 12, by categorizing the tendency of the user based on the substance amount information item and the frequency information item outputted from the vacuum cleaner 501, the washing machine 502, and the rice cooker 503 and the types of devices determined by the device information items. Specifically, the user tendency estimation unit 111A categorizes each of the devices 2 in the home 550 into quadrants shown in FIG. 9 based on the threshold set according to the type of the device 2, and estimates the tendency of the user as shown in FIG. 12 based on the categorization result.

The first row in the table in FIG. 12 indicates that the user tendency estimation unit 111A can categorize the user's tendency for the refrigerator into the fourth quadrant based on the use history of the refrigerator, and can categorize the user's tendency for all of the other devices into the second quadrant.

Here, the second quadrant indicates that the frequency of processing is low and the amount of processing per processing is large. Thus, the tendency of the user for the vacuum-cleaner can be estimated that the user has a sloppy character or is a working person who can do the cleaning only on holidays. In other words, it is difficult to determine whether the user is a sloppy person or a working person, from the categorization into the second quadrant based only on the use history of the vacuum cleaner. However, from the categorization of the user's tendencies for the vacuum cleaner, washing machine, and rice cooker into the second quadrant and the categorization of the user's tendency for the refrigerator into the fourth quadrant, it can be estimated that it is very likely that the user of these devices is not a sloppy person but a working person. This is because, when the user's tendency for the rice cooker is categorized into the second quadrant, it indicates that the frequency of the use of rice cooker is not high but the amount of rice per cooking is large and thus it is likely that the user freezes rice. From such a custom, it can be estimated that the user is an organized person rather than a sloppy person. Furthermore, if the user has simply a sloppy character, it is unnatural that the user's tendency for the refrigerator is categorized into the fourth quadrant. This is because, when the user's tendency for the refrigerator is categorized into the fourth quadrant, it indicates that the frequency of door-opening is high but the temperature rise in the refrigerator is small. This leads to an estimation that the user has an organized character.

Accordingly, the user tendency estimation unit 111A estimates that the user having the device-based tendency categorized as shown in the first row is a working person having an organized character.

The second row in the table in FIG. 12 indicates that the user's tendencies for the vacuum cleaner, washing machine, and refrigerator are categorized into the second quadrant and only the user's tendency for the rice cooker is categorized into the third quadrant. The user tendency estimation unit 111A estimates that the user having the device-based tendency categorized as shown in the second row is a sloppy person. It is because the user's tendency for the rice cooker is categorized into the third quadrant, which can be understood that the user does not cook often and mainly eats out. It is also because, the user's tendency for the refrigerator is categorized into the second quadrant, which indicates that the frequency of door-opening is low but the temperature rise in the refrigerator is great, and thus the tendency can be estimated that the user has a sloppy character and does not close the door frequently.

The third row in the table in FIG. 12 indicates that the user's tendency for all of the devices (vacuum cleaner, washing machine, rice cooker, and refrigerator) can be categorized into the fourth quadrant. Specifically, the frequency is high and the amount of processing per processing is small for all of these devices. From this situation, the user tendency estimation unit 111A can estimate that the user having the device-based tendency as shown in the third row is an organized person and does the housework frequently.

The fourth row in the table in FIG. 12 indicates that the user's tendency for all of the devices (vacuum cleaner, washing machine, rice cooker, and refrigerator) can be categorized into the first quadrant. Specifically, the frequency is high and the amount of processing per processing is large for any of the devices. From this situation, the user tendency estimation unit 111A can estimate that the user having the device-based tendency as shown in the fourth row has a big family.

[Advantageous Effect]

As described above, with the present embodiment, the tendency of the user can be estimated more accurately by combining the use histories (substance amount information items and frequency information items) outputted from devices of different types in a single home. Specifically, with the information providing method and the information providing apparatus according to the present embodiment, the tendency of the user can be estimated more accurately by combining the use histories of plural devices. This allows presenting to the user suitable information according to the estimation result.

Embodiment 3

In Embodiment 3, description shall be provided on a case where the information providing apparatus obtains the use histories from plural devices of the same type via a network, and estimates the tendency of the user.

Figure 13:
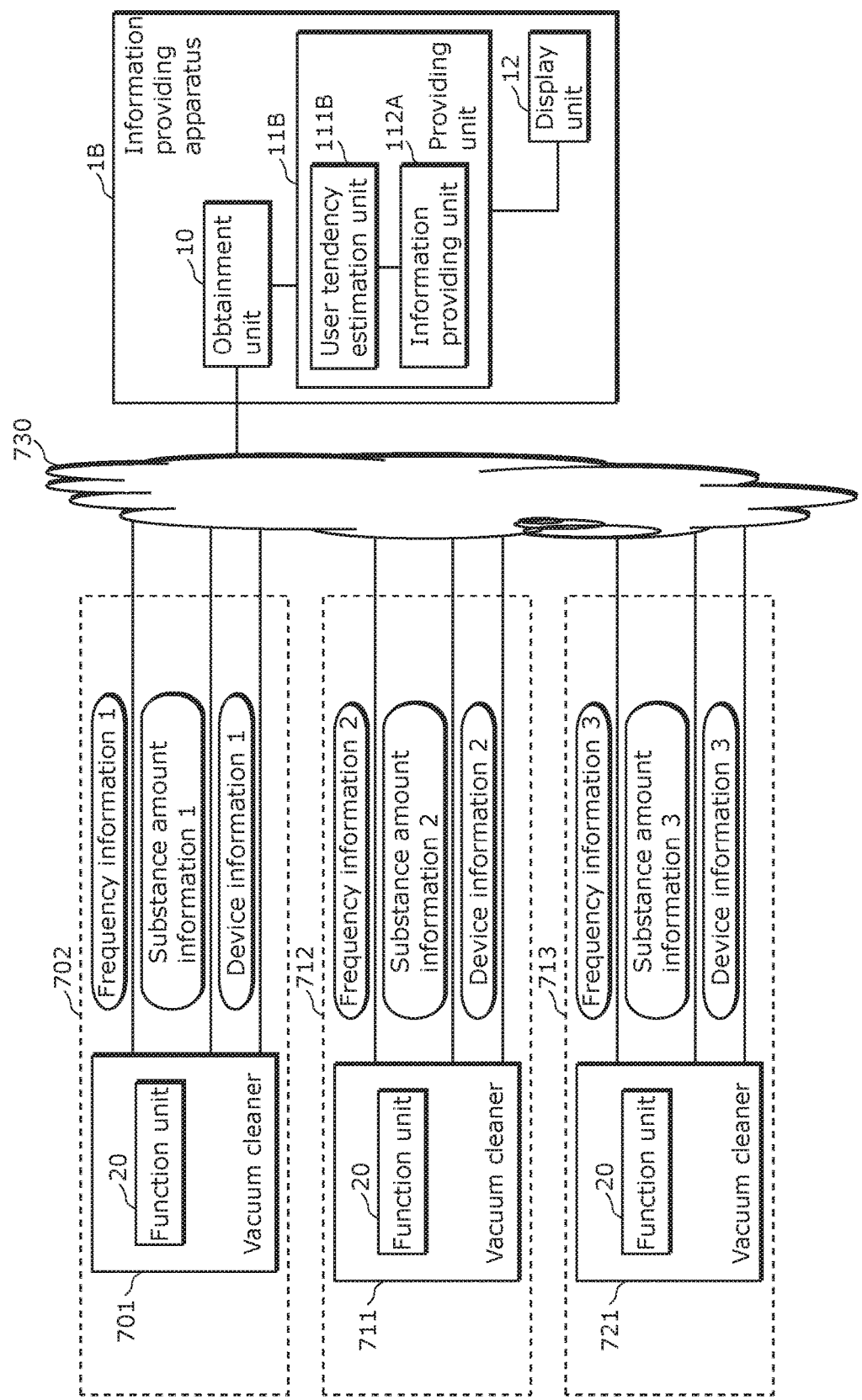
FIG. 13 is a diagram illustrating a configuration of an information providing system according to Embodiment 3.

FIG. 13 shows a configuration of an information providing system according to Embodiment 3. It is to be noted that the same constituents as those in FIG. 1 are assigned with the same numerals, and the detailed description is omitted.

The information providing system shown in FIG. 13 includes an information providing apparatus 1B, a vacuum cleaner 701, a vacuum cleaner 711, and a vacuum cleaner 721, which are connected via a network 730.

[Configuration of Device]

The vacuum cleaner 701, the vacuum cleaner 711, and the vacuum cleaner 721 shown in FIG. 11 correspond to the specific example of the devices 2 described in Embodiment 1, and are home appliances used by different users at different homes (home 702, home 712, and home 722, respectively).

The vacuum cleaner 701, the vacuum cleaner 711, and the vacuum cleaner 721 each includes the function unit 20, and outputs the frequency information and the substance amount information which are the use history described in Embodiment 1.

In the present embodiment, the vacuum cleaner 701, the vacuum cleaner 711, and the vacuum cleaner 721 further output the device information for identifying the type of itself (device information 1, device information 2, and device information 3, respectively). Such device information items are associated with the substance amount information items and the frequency information items outputted by the respective devices (the vacuum cleaner 701, the vacuum cleaner 711, and the vacuum cleaner 721), and allow identifying from which device the substance amount information items and the frequency information items are outputted. The device information 1 to device information 3 in FIG. 13 each includes information for identifying that the device is a vacuum cleaner, and further includes information for identifying the homes (home 702, home 712, and home 722) in which the respective devices (the vacuum cleaner 701, the vacuum cleaner 711, and the vacuum cleaner 721) are used.

The network 730 connects the vacuum cleaner 701, vacuum cleaner 711, and the vacuum cleaner 721 with the information providing apparatus 1B, and transmits the frequency information items, the substance amount information items, and the device information items outputted from the vacuum cleaner 701, the vacuum cleaner 711, and the vacuum cleaner 721 to the information providing apparatus 1B.

In the present embodiment, the network 730 may be implemented by a domestic LAN in each of the homes 702, 712, and 722. Furthermore, the network 730 is a wide-area network and is connected to the information providing apparatus 1B in a server of an external operator via a gateway of the domestic LAN of each of the homes 702, 712, and 722.

[Configuration of Information Providing Apparatus]

The information providing apparatus 1B shown in FIG. 13 includes a providing unit 11B having a different configuration from that of the information providing apparatus 1A in Embodiment 2. Description shall be provided below on the portion which is different from the information providing apparatus 1A in Embodiment 2.

The obtainment unit 10 obtains the use histories of other devices, which are of the same type as the device and are used by other users different from the user of the device. More specifically, the obtainment unit 10 obtains the use histories (frequency information items and substance amount information items) and the device information items outputted by the devices 2 (vacuum cleaner 701, vacuum cleaner 711, and vacuum cleaner 721) used by other users.

The user tendency estimation unit 111B estimates the tendency of the user of the device based on the use history of the device and the use histories of the other devices obtained by the obtainment unit 10. More specifically, the user tendency estimation unit 111E collects the use histories (frequency information items and substance amount information items) of the devices 2 used by different users, based on the type of the devices 2 designated by the device information items, and estimates the respective users' tendencies for the devices 2 (vacuum cleaner 701, vacuum cleaner 711, and vacuum cleaner 721) which are different from and of the same type as the device.

Example

Figure 14:
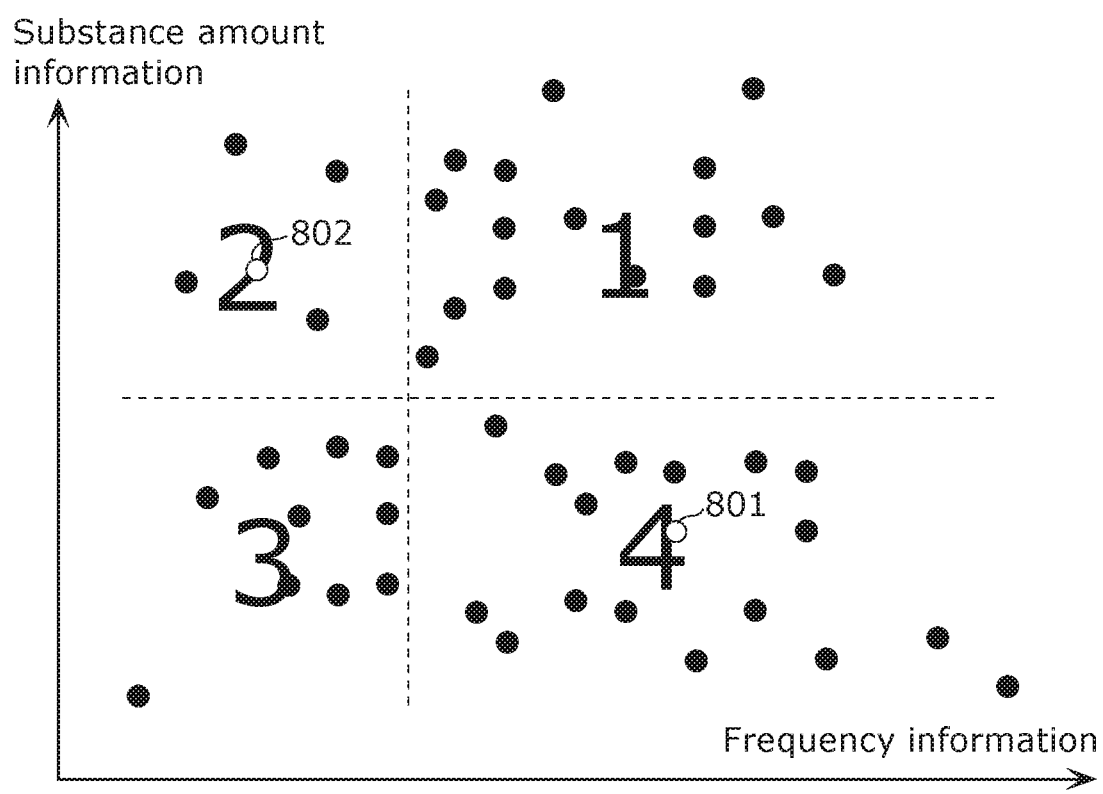
FIG. 14 is a four-quadrant diagram for estimating a tendency of a user in Example according to Embodiment 3.

FIG. 14 is a four-quadrant diagram for estimating a tendency of a user in Example according to Embodiment 3. In FIG. 14, in the same manner as in FIG. 9, the frequency information is set along the horizontal axis and the substance amount information is set along the vertical axis, and the points plotted according to the combination of the frequency information and the substance amount information are categorized into the four quadrants.

The difference in the categorization scheme indicated in FIG. 14 and the categorization scheme in FIG. 9 is as follows.

In the example shown in FIG. 9, points plotted according to the frequency information and the substance amount information are divided into the four quadrants using a threshold preset for each type of device. In contrast, in the example shown in FIG. 14, the threshold is not used and the points are relatively categorized into the four quadrants based on the use histories (frequency information items and substance amount information items) of the plural devices of the same type used by the different users. More specifically, although the user who has a tendency of doing the laundry once a week and in a large amount was estimated as a sloppy person (second quadrant) in the example shown in FIG. 9, this may not be true in the present embodiment shown in the example in FIG. 14. For example, when most of the users of the devices of the same type do the laundry once a week, the user who does the laundry once a week is not estimated as a sloppy person. Among them, if there is a user who has a tendency of doing the laundry only once a month, this user is estimated as a sloppy person (second quadrant). In contrast, if most of the users of the devices of the same type have the tendency of doing the laundry everyday, a user having a tendency of doing the laundry once in three days can be estimated as a sloppy person.

It is to be noted that the scheme for relatively categorizing the points plotted according to the combination of the frequency information and the substance amount information into the four quadrant is not limited to the above. The categorization into four quadrants may be performed using a wide variety of other schemes. For example, the categorization may be made by setting the same number of samples into the four quadrants, or by taking into account the distribution level of the plotted points. Furthermore, the quadrants may be set to place the plotted point of the home (user), whose the tendency is preliminarily known through an inquiry and the like, at the center. For example, if it is preliminarily known that the user in a home 801 is a type of person who does the housework frequently in the example in FIG. 14, it is sufficient to set the fourth quadrant having the plotted point of the use history of the home 801 at the center. Furthermore, if it is preliminarily known that the user in a home 802 is a type of person who does the housework sloppily, it is sufficient to set the second quadrant having the plotted point of the use history of the home 802 at the center.

[Advantageous Effect]

As described above, with the present embodiment, it is possible to relatively estimate the tendency of the user by collecting the use histories (substance amount information items and frequency information items) outputted from devices of the same type in plural homes through the wide area network. This allows estimating the tendency of the user more appropriately without taking into account whether or not the threshold used for estimating the tendency of the user is varying, since it is possible to estimate the tendency of the user through the relative evaluation even when the living proactive of whole society (whole users) changes.

Embodiment 4

In Embodiment 4 below, description shall be provided on the content of information provided based on the estimated tendency of the user described in Embodiments 1 to 3 and how to provide the information to the user.

Figure 15:
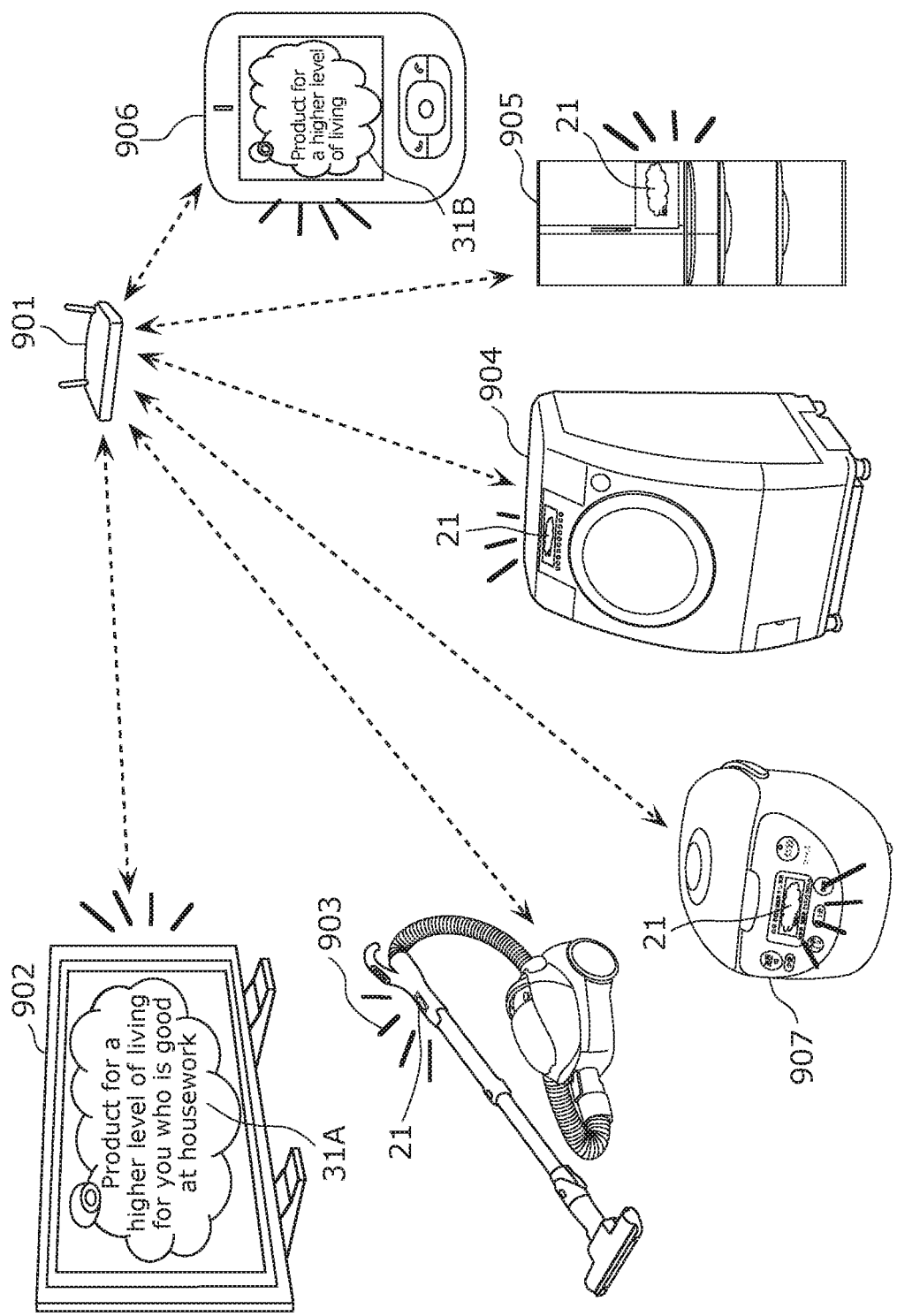
FIG. 15 is a diagram illustrating an information providing method to a device according to Embodiment 4.

FIG. 15 is a diagram for illustrating an information providing method to a device in Embodiment 4. FIG. 15 illustrates a wireless LAN station 901, a TV 902, a vacuum cleaner 903, a washing machine 904, a refrigerator 905, a mobile terminal 906 such as a smartphone, and a rice cooker 907.

The vacuum cleaner 903, the washing machine 904, the refrigerator 905, and the rice cooker 907 in FIG. 15 correspond to the specific examples described in Embodiments 1 to 3, respectively. The devices in FIG. 15 output the use histories (frequency information items and substance amount information items) to the information providing apparatus, and the information providing apparatus provides the user with optimized information according to the outputted use histories.

Each of these devices are connected with the wireless LAN station 901 via a wireless LAN, and includes a display unit 21 that displays the information provided by the information providing apparatus, for example.

For example, when the device is the vacuum cleaner 903, the display unit 21 is a liquid crystal display close to the switch unit of the wand. The user of the vacuum cleaner 903 can view the information displayed on the display unit 21. Here, the information displayed on the display unit 21 may be information relevant to the vacuum cleaner 903 or general information which is not relevant to the vacuum cleaner 903 and is likely to attract the interest of the user of the vacuum cleaner 903. The same goes for the case where the device is the washing machine 904, the refrigerator 905, and the rice cooker 907.

Although the TV 902 and the mobile terminal 906 in FIG. 15 are not the device 2 described in Embodiments 1 to 3, these are connected with the wireless LAN station 901, and include a display units (display unit 31A and display unit 31B, respectively). In other words, since the TV 902 and the mobile terminal 906 are not the device 2, they do not output the use histories (frequency information items and substance amount information items) to the information providing apparatus but operate as display devices for displaying the information provided by the information providing apparatus.

The information provided from the information providing apparatus may include a variety of information according to the tendency of the user, in addition to those described in Embodiments 1 to 3. For example, information indicating the current estimated tendency of the user of the device 2 may be provided. Deception on this example shall be provided with reference to FIG. 16.

Figure 16:
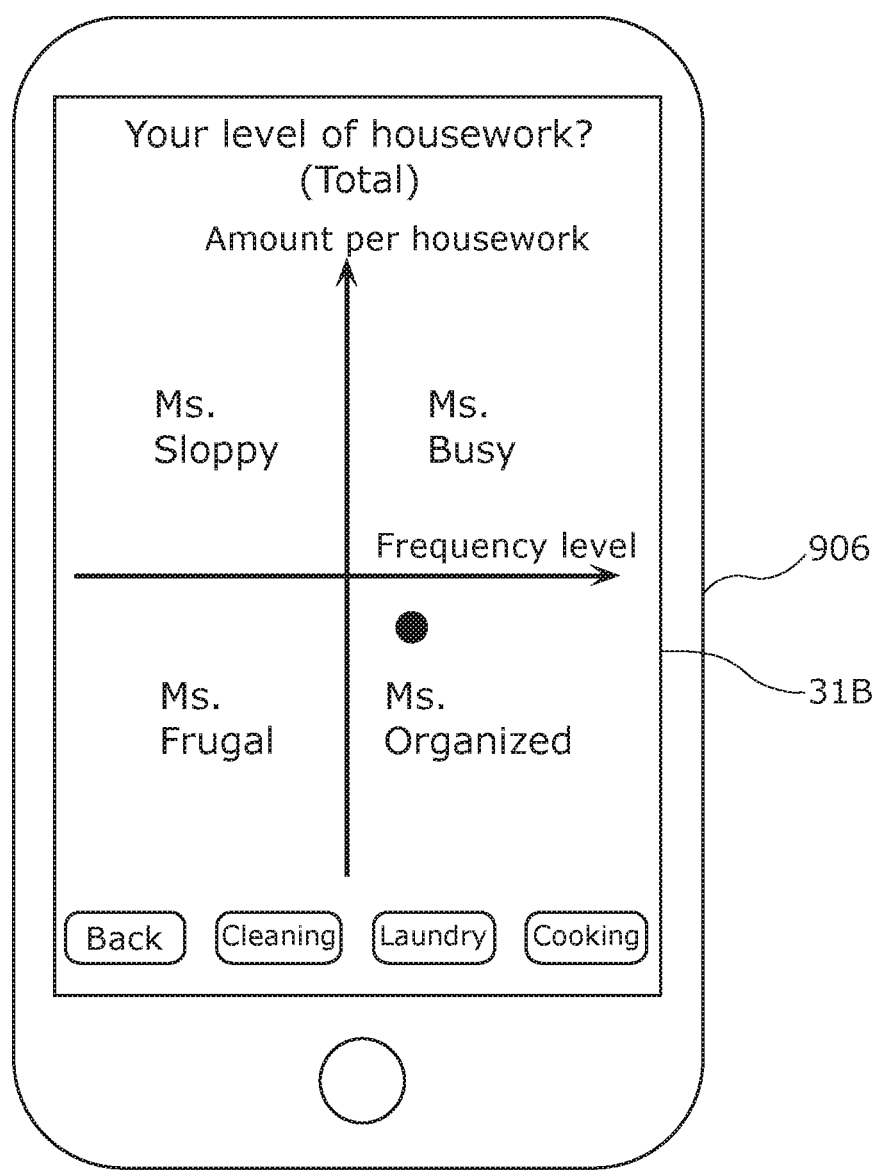
FIG. 16 is a diagram illustrating an example of information displayed on a display device according to Embodiment 4.

FIG. 16 illustrates an example of information displayed on the display device in Embodiment 4. In FIG. 16, a mobile terminal 906 having a display unit 31B is illustrated as the display device.

The user of the device 2 can check, as shown in FIG. 16, how the user's way of doing housework is estimated as the tendency of a user, based on the information displayed on the display unit 31B of the mobile terminal 906. Although FIG. 16 shows an example in which the four quadrants basically same as those in FIG. 9 is displayed, the names are changed to be more user-friendly.

For example, there is a case where the tendency of the user is estimated as "Ms. Sloppy" but the user doesn't like this estimation and cannot get interested in information selected for "Ms. sloppy". In this case, an advantageous effect of improving the motivation of the user for the housework is produced such as the user does the housework more frequently to be estimated as "Ms. organized". Furthermore, when the tendency of the user is estimated by the relative four quadrants as described in FIG. 14, it is an option to allow the user to change the axis for the relative evaluation by self-reporting that the user is not "Ms. sloppy" but is "Ms. organized".

Although FIG. 16 illustrates an example in which the total result obtained by combining the use histories of devices of different types are displayed in the case described in Embodiment 2, this is not an only example. For example, the result of estimation for each of the devices 2 may be displayed separately. FIG. 16 indicates that the estimation result for each device can be displayed when an icon in the lower portion of the screen is touched.

Furthermore, the information provided to the user in the above manner includes advertisement for a product that suits the estimated tendency of the user. The information including the advertisement for a product is optimized using the estimated tendency of the user and is provided. For example, since a person (user) who is estimated to have a tendency of doing housework frequently is likely to have a strong tendency in making efforts to make his/her life more comfortable, advertisement for a product which helps the user reach a higher level of living may be provided. Examples of advertisement for a product which helps the user reach a higher level of living include sophisticated interior, foodstuff which takes time to cook, clothes having a high quality but difficult to wash, and so on. Furthermore, since a person (user) who is estimated to have a tendency of having a sloppy character is likely to have a strong tendency in making less efforts, which is the opposite from the above case, an advertisement may be provided for a product such as storage furniture which allows easy tidying, foodstuff which allows easy and good cooking, and clothes which look cool even when they get stretched out because of inappropriate washing. Moreover, when the material (wooden floor, straw-mat, and carpet) of the floor at home of the user can be determined by the head of the vacuum cleaner as described in Embodiment 1, advertisement according to the tendency of the user such as whether the user likes something Japanese or Western may be provided. Moreover, when it can be estimated that the user has a pet, advertisement on a pet-related product may be provided.

The information provided to the user in the above manner may be information other than advertisement. For example, to the user who is estimated to have a tendency of having a big family or pet, that is of doing a lot of housework (and categorized into the first quadrant in FIG. 9), information on advice for efficiently doing a lot of housework may be provided. Furthermore, to a user who is estimated to have a tendency of being not good at cleaning from the information related to the movement of the vacuum cleaner or the head of the vacuum cleaner included in the use history, information on advice for how to do the cleaning better may be provided. In contrast, to a user who is estimated to have a tendency of being good at cleaning, an incentive award which is a designation such as "skillful cleaner" may be displayed as the information to be provided.

Moreover, when a user is a member of an existing social networking service for example, it is possible to link the information providing system with the social networking service and automatically make a post related to the "user's update" such as "got a trophy as a skillful cleaner", as the information to be provided to the user. In this case, if the user's friends on the social networking service give some feedback such as "Like", the user become even more motivated for housework.

Furthermore, when the collection of use histories of the devices used by plural users is performed as described in Embodiment 3, a service may be provided in which users having the similar tendency in housework are found based on the collection result and these users are introduced to each other. It is more beneficial when such a service is linked with the existing social networking service.

Furthermore, in some social networking services, there are cases where a person, usually someone who is the user's "friend's friend", is introduced by indicating "People you may know". In such a case, if a person is introduced by indicating "Why don't you become friends with this person who does housework as frequently as you do?", the person who received the introduction is more likely to register the person as a friend, which produces an advantageous effect for both the users and the social networking service side. A service may be provided for these people who established friendship relationship to update the progress of their housework. For example, if a message such as "Your friend Ms. XXX has already finished cleaning for today." is displayed on the display unit of the vacuum cleaner, an advantageous effect is produced that the user is motivated to do the cleaning, too.

In addition, the information provided to the user may include the following. Specifically, a game may be provided for causing the user to compete with friends for the frequency of housework. Furthermore, a ranking for the frequency and amount of housework may be made by a unit beyond friends, that is a unit of a town, city, prefecture, and country in which the home of the user is, or the world, and in what place the user is in the ranking may be displayed. Furthermore, a game service linked with social games may be provided in which doing housework leads to increase of the currency or energy of the character or growth of the character in the game.

Embodiment 5

In Embodiments 1 to 3, description is provided on how the tendency of the user is estimated. In Embodiment 4, description is provided on what information is presented to the user according to the estimated tendency. In embodiment 5, the whole image of the service is described in which the above-described information is provided using the information providing system, the information providing apparatus, and the devices described in Embodiments 1 to 4.

Figure 17A:
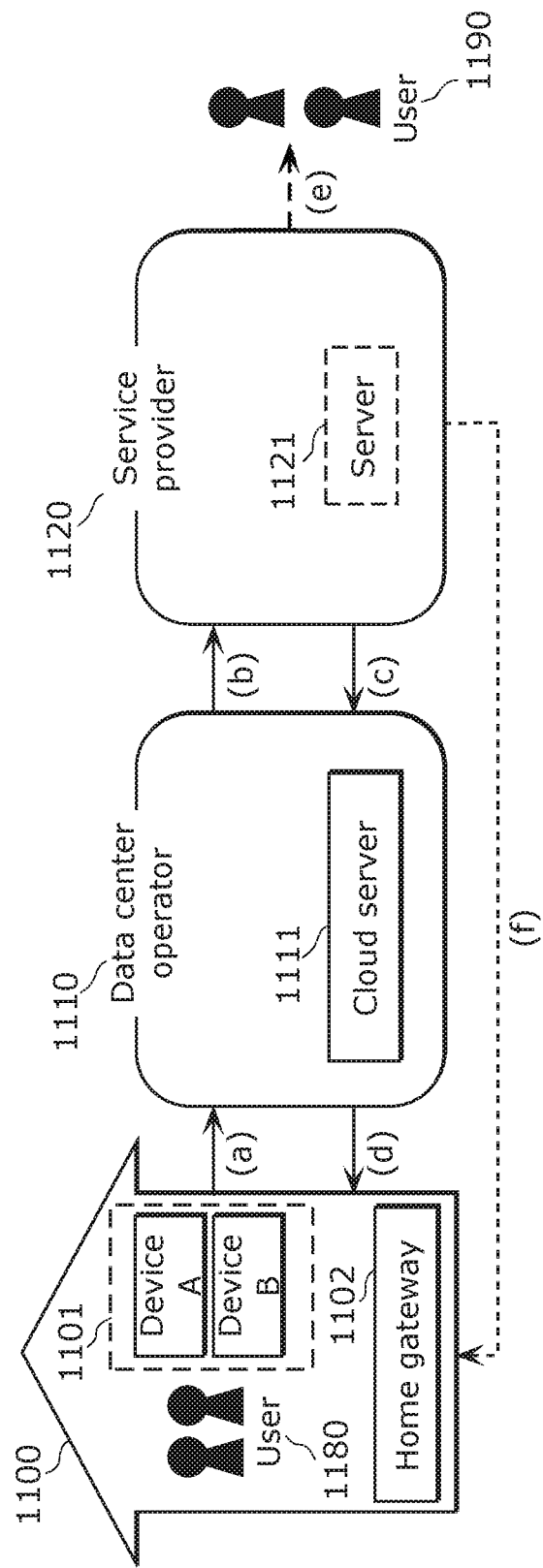
FIG. 17A is a diagram illustrating an overall image of an information providing system according to Embodiment 5.
Figure 17B:
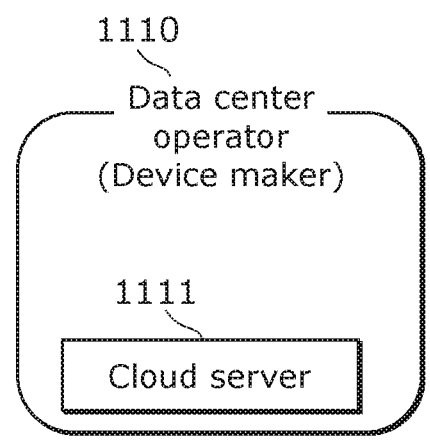
FIG. 17B is a diagram illustrating an example of partial modification of the configuration of the information providing system according to Embodiment 5.
Figure 17C:
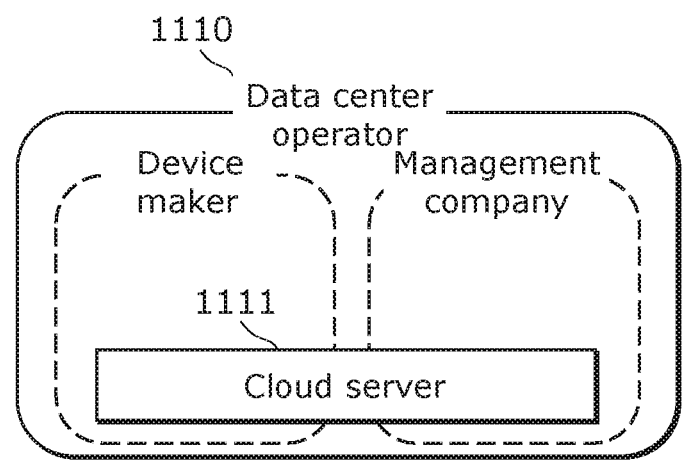
FIG. 17C is a diagram illustrating an example of partial modification of the configuration of the information providing system according to Embodiment 5.

FIG. 17A is a diagram illustrating an overall image of an information providing system according to Embodiment 5. FIG. 17B is a diagram illustrating an example of partial modification of the configuration of the information providing system according to Embodiment 5. FIG. 17C is a diagram illustrating an example of partial modification of the configuration of the information providing system according to Embodiment 5.

In a home 1100 shown in FIG. 17A, the use history (frequency information and substance amount information) of plural devices 1101 (device A, device B, and so on) used by a user 1180 is distributed to a cloud server 1111 operated by a data-center operator 1110 ((a) in FIG. 17A).

The cloud server 1111 has a function of the obtainment unit 10 and the user tendency estimation unit 111 in Embodiments 1 to 4. The cloud server 1111 is capable of collecting the obtained use histories of the plural devices used by users in plural homes and estimating the tendency of each user according to the method described in Embodiments 1 to 3. The estimated information related to the tendency of the user is distributed to a server 1121 operated by a service provider 1120 ((b) in FIG. 17A).

The server 1121 has a function of the information providing unit 112. The server 1121 generates or selects information suitable for each user based on the estimated tendency of the user, and distributes the generated or selected information to the home 1100 directly ((f) in FIG. 17A) or via the data-center operator 1110 ((C) and (d) in FIG. 17A). The distributed information enters the home 1100 via a home gateway 1102, and is displayed on the display unit operated by the user 1180.

It is to be noted that the service provider 1120 may collect and process the tendency of the home appliance collected from each home 1100, generate a new service by combining the collected and processed tendency with existing data at the service provider 1120, and provide the new service to another user 1190. An example of such new service includes a nationwide weather map in which the use status of washing machines and map information are combined (based on the fact that more people do the laundry when the weather is fine). As described above, the use history of the device 1101 by the user 1180 can be used not only for providing optimized information to the user 1180 himself/herself but also for providing basic information for separate services.

Furthermore, the configuration of the information providing system is not limited to that shown in FIG. 17A. Specifically, although it has been described that the cloud server 1111 estimates the tendency of the user from the use history of the device and distributes the estimated tendency to the service provider 1120, all of the use histories may be distributed to the service provider 1120 and the service provider 1120 may internally estimate the tendency of the user, as necessary. Furthermore, information related to the estimated tendency and limited use history may be distributed to the service provider 1120.

Furthermore, as shown in FIG. 17B and FIG. 17C, the data-center operator 1110 manages the cloud server 1111 in a variety of manner. FIG. 17B illustrates a form in which the device manufacturer (so-called home appliances manufacturer) which manufactures and distributes the device 1101 manages the cloud server 1111. FIG. 17C illustrates a form in which the device manufacturer (so-called home appliances manufacturer) which manufactures and distributes the device 1101 and another management company collaboratively manage the cloud server 1111.

Figure 18:
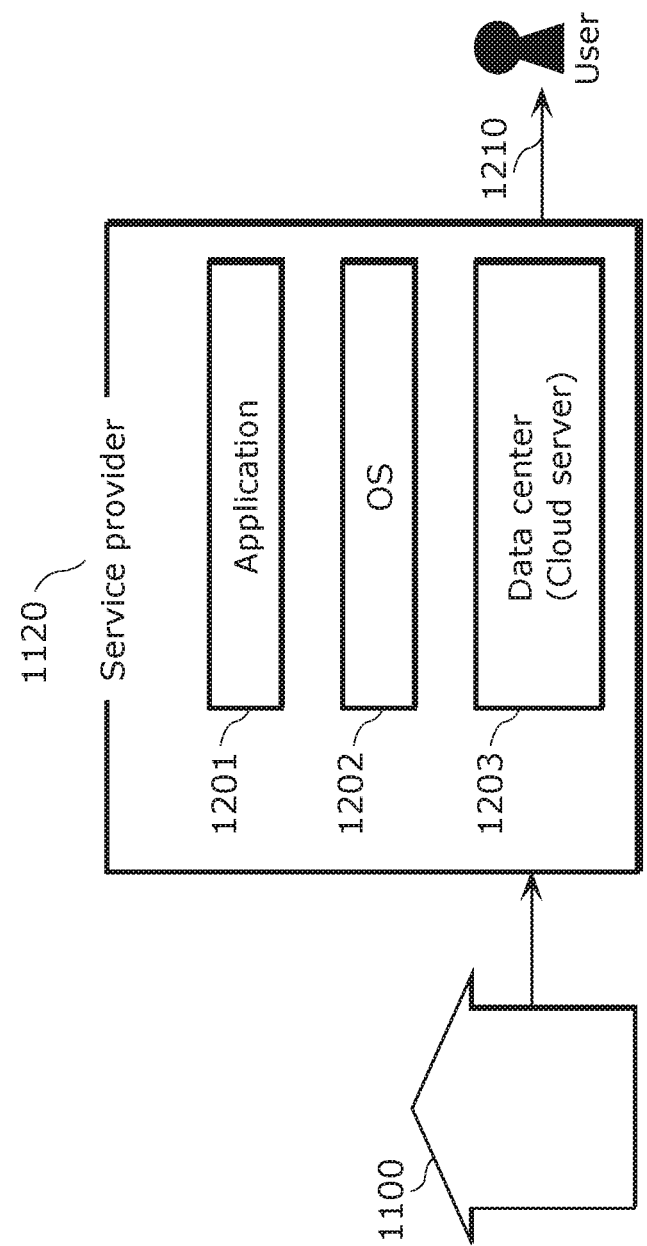
FIG. 18 is a diagram illustrating a service type 1 (own data-center type).
Figure 19:
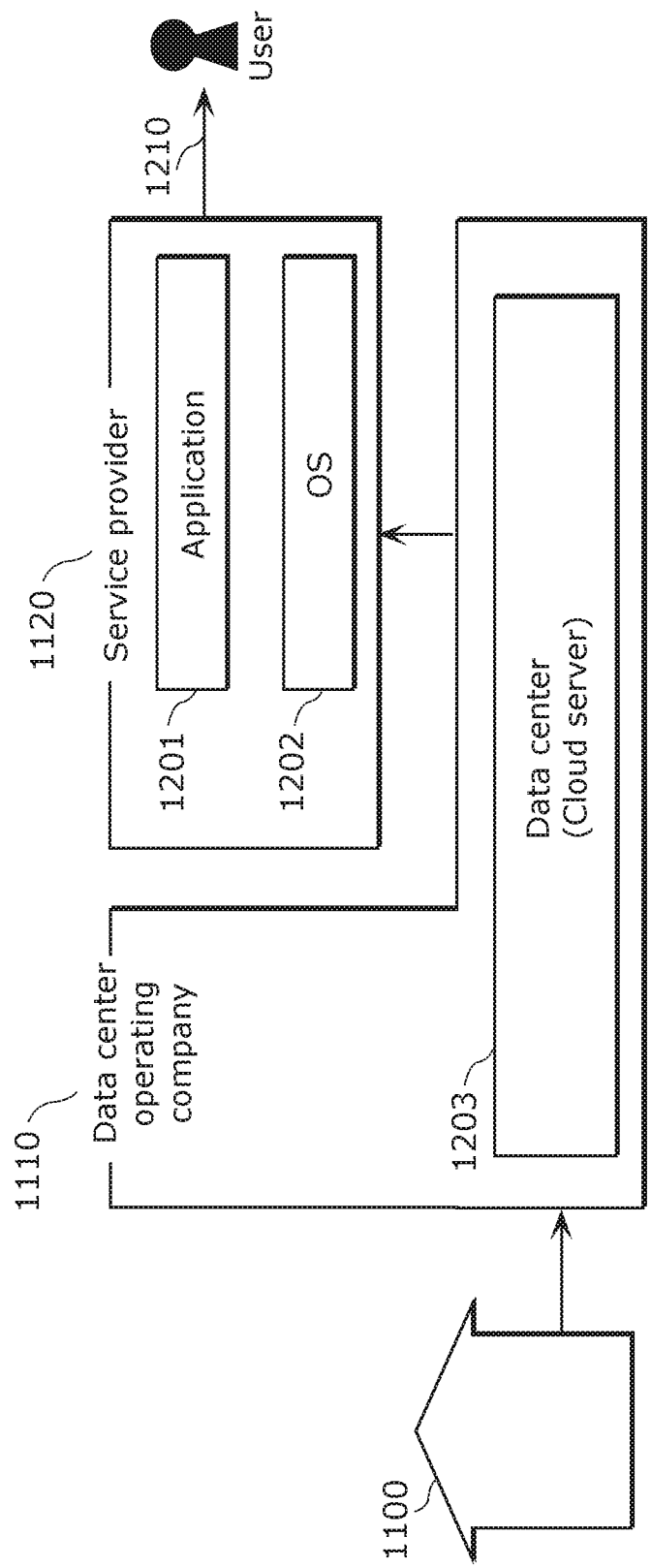
FIG. 19 is a diagram illustrating a service type 2 (IaaS use type).
Figure 20:
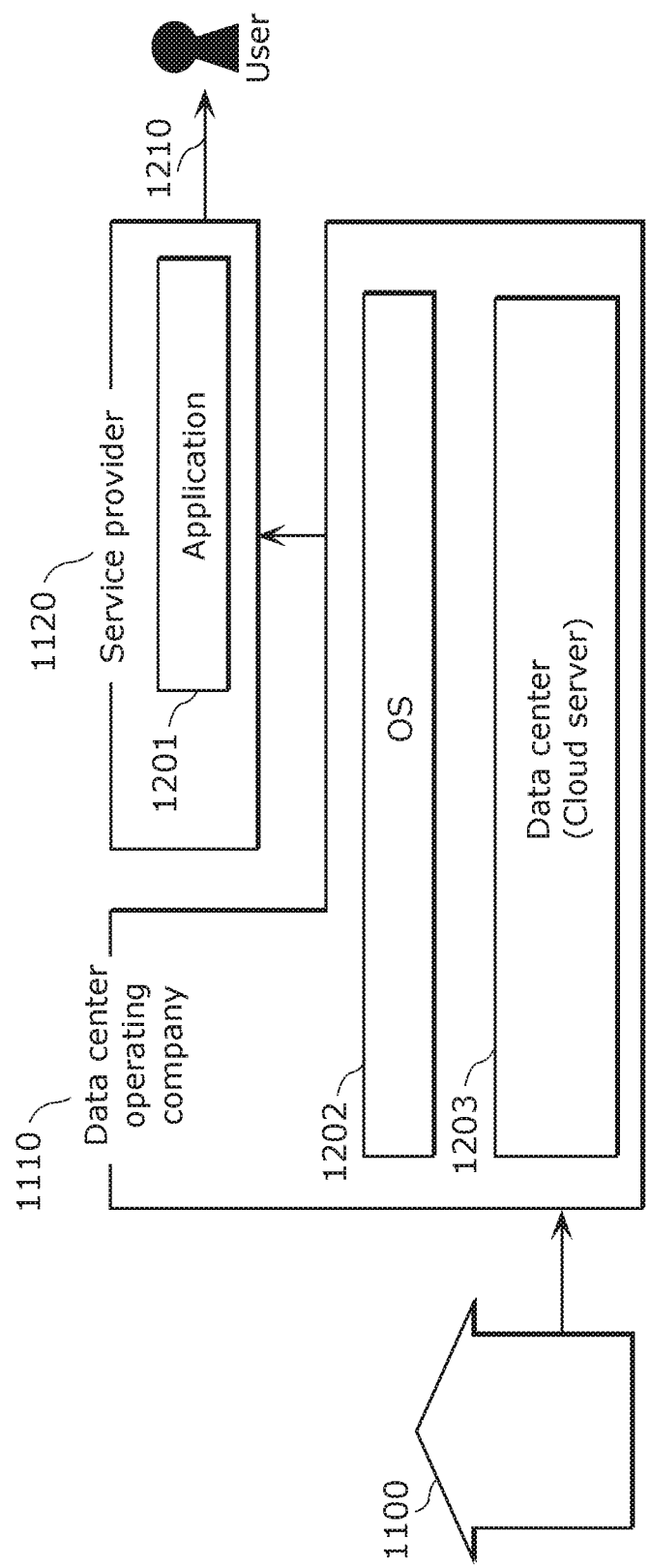
FIG. 20 is a diagram illustrating a service type 3 (PaaS use type).
Figure 21:
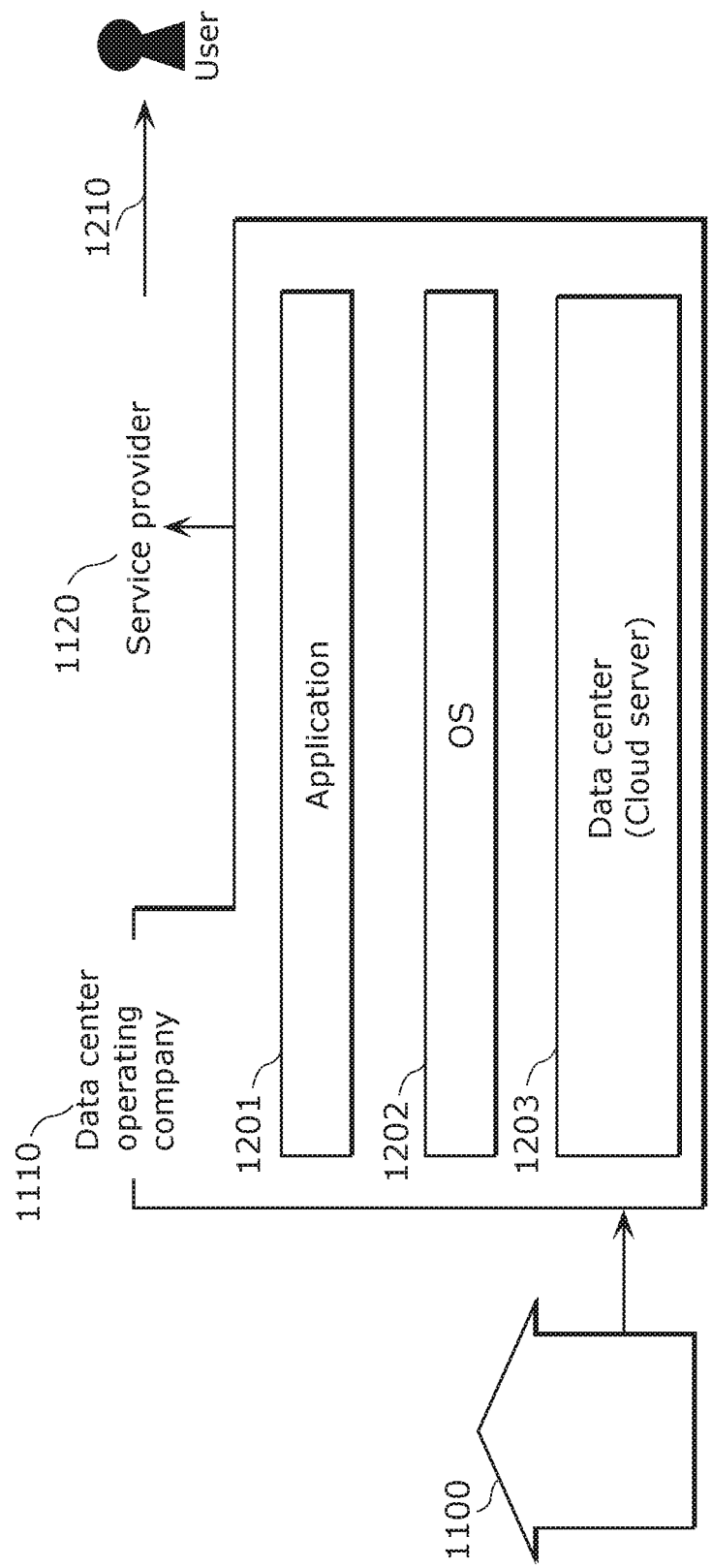
FIG. 21 is a diagram illustrating a service type 4 (SaaS use type).

Furthermore, there is a wide variety of configuration of the service provider (1120). FIG. 18 is a diagram illustrating the service type 1 (own data-center type), and FIG. 19 is a diagram illustrating the service type 2 (IaaS use type). FIG. 20 is a diagram illustrating the service type 3 (PaaS use type), and FIG. 21 is a diagram illustrating the service type 4 (SaaS use type).

More specifically, FIG. 18 illustrates the configuration in which the service provider operator alone manages the whole service provider 1120, which is all of the application 1201, the OS 1202, and the cloud server 1203. FIG. 19 illustrates a configuration in which the data-center operator 1110 manages the cloud server 1203 and the service provider 1120 manages the OS 1202 and the application 1201. FIG. 20 illustrates a configuration in which the data-center operator 1110 manages the cloud server 1203 and the OS 1202 and the service provider 1120 manages the application 1201. FIG. 21 illustrates a configuration in which the data-center operator 1110 manages all of the cloud server 1203, the OS 1202, and the application 1201, and the service provider 1120 only executes and controls the application. In any of the configurations, the user is provided with information most suitable for the user among the information managed by the service provider, according to the user's home appliances use history.

As described above, with the information providing method and so on according to the embodiments of the present invention, it is possible to provide information suitable for a user of a device without requiring the user to input information such as search word. Specifically, all the user need to do is to simply do routine housework using a device for processing substance, and information suitable for the user of the device can be provided without the information input by the user.

It is to be noted that in each of the above non-limiting embodiments, each constituent element may be implemented by being configured with a dedicated hardware or being executed by a software program suitable for each constituent element. Each constituent element may be implemented by reading and executing the software program recorded on a hard disk or a recording medium such as a semiconductor memory, performed by a program execution unit such as a CPU or a processor. Here, the software which implements an information terminal device or the like in each of the above non-limiting embodiments is a program described below.

Specifically, the program is for causing a computer to execute: obtaining a use history of a device used by a user for processing on a substance; and providing information according to the obtained use history to the user, wherein the processing on the substance includes a movement of the substance or a change in a temperature of the substance.

The foregoing has described the information providing method and so on according to one or more embodiments of the present invention; however, the present invention is not limited to these embodiments. Other forms in which various modifications apparent to those skilled in the art are applied to the embodiments, or forms structured by combining constituent elements of different embodiments are included within the scope of the present invention, unless such changes and modifications depart from the scope of the present invention.

For example, when all the devices at home are connected via a network such as a wireless LAN as shown in FIG. 15, a configuration other than the above-described configurations may also be adopted. For example, linking the vacuum cleaner with an air cleaner or an air conditioner allows prompting the user to clean according to the amount of mote in the air detected by the air vacuum cleaner, determining whether the cleaning was done well by checking the amount of mote in the air by the air cleaner, and automatically operating the air cleaner while cleaning. Furthermore, linking the vacuum cleaner with a telephone allows, when a phone rings, stopping the vacuum cleaner for answering the phone. Furthermore, linking the information providing system with an electric power management system of a whole condominium apartment allows: measuring the power consumption of the whole apartment; and when the power consumption is at a level indicating that most of the residents are sleeping, preventing the vacuum cleaner from being turned on not to disturb their sleep. Moreover, linking the vacuum cleaner with a smart phone allows, when a dust bag is changed, adding "dust bag" to a shop list in the smartphone. Furthermore, linking the vacuum cleaner with a TV allows sound of the TV to come out from the handle of the vacuum cleaner while cleaning.

Although the above embodiments described an example in which the use history includes the substance amount information and the frequency information, this is not an only example. The use history may include the substance amount information only. This allows providing information suitable for the user based on the substance amount information included in the use history. When the device is a vacuum cleaner for example, information prompting the user to clean the room more often or advertisement for a cleaner can be provided to the user based on the average substance amount of the week.

Furthermore, the use history may include the frequency information only. This allows providing information suitable for the user based on the frequency information included in the use history. When the device is a vacuum cleaner for example, based on the frequency of cleaning per week, information on a relevant product that suits the frequency (lifestyle) can be provided to the user.

INDUSTRIAL APPLICABILITY

The present invention is applicable for a method of providing a service for providing optimal information for each user, such as advertisement and so on which attracts the user's interest, based on the use history of the device. The present invention is particularly applicable for providing Internet advertisement to people who do not use specific terminals such as personal computers or smartphones.

REFERENCE SIGNS LIST 1, 1A, 1B Information providing apparatus
2, 2A, 2B Device
10 Obtainment unit
11, 11A, 11B Providing unit
12, 21, 21B, 31, 31A, 31B Display unit
20 Function unit
111, 111A, 111B User tendency estimation unit
112, 112A Information providing unit
201 Substance processing unit
202 Substance amount determination unit
203 Control unit
204 Communication unit
501, 701, 711, 721, 903 Vacuum cleaner
502, 904 Washing machine
503, 907 Rice cooker
504, 730 Network
550, 702, 712, 722, 801, 802 Home
901 Wireless LAN station
902 TV
905 Refrigerator
906 Mobile terminal

The invention claimed is:

1. An information providing method for an information providing apparatus that provides information, the information providing method comprising:
   obtaining a use history of at least one device used by a user for processing on a substance;
   estimating a character tendency of the user based on the obtained use history without requiring input information input from the user regarding character tendency, the character tendency being a tendency of the user to perform an action involved in the processing on the substance; and
   providing information according to the estimated character tendency to the user by causing a display unit to display information according to the estimated tendency of the user,
   wherein the processing on the substance is a movement of the substance or a change in a temperature of the substance,
   the at least one device is used for housework and processing the substance through the user's use of the at least one device,
   the use history indicates substance amount information indicating an amount of the substance processed through the use of the at least one device,
   the at least one device includes a plurality of devices of different types, the plurality of devices includes different household appliances for performing different processing on the substance, the at least one device includes at least one of a vacuum cleaner, a washing machine, a rice cooker and a refrigerator, in the obtaining, respective use histories of the plurality of devices are obtained, and in the estimating, the character tendency of the user is estimated based on the obtained respective use histories, and the character tendency of the user is estimated from the use histories plotted in one of four quadrants, each of the quadrants indicating a different tendency of the user.

2. The information providing method according to claim 1, wherein in the obtaining, a use history of an other device is further obtained, the other device being of a same type as the at least one device and being used by an other user, and in the estimating, the character tendency of the user is estimated based on a collection result of the obtained use history of the at least one device and the obtained use history of the other device.

3. The information providing method according to claim 1, wherein the use history includes frequency information indicating a frequency of use of the at least one device by the user.

4. The information providing method according to any one of claim 1, wherein the use history includes the substance amount information and frequency information, the substance amount information indicating the amount of the substance processed through the use of the at least one device, the frequency information indicating a frequency of use of the at least one device by the user, and in the providing, information according to a character tendency of the user which is estimated according to a combination of the substance amount information and the frequency information is provided.

5. The information providing method according to claim 4, wherein the information includes an advertisement on a product that suits the estimated character tendency of the user.

6. The information providing method according to claim 1, wherein when the household appliance includes the vacuum cleaner, the processing on the substance is vacuuming dust using the vacuum cleaner.

7. The information providing method according to claim 1, wherein when the household appliance includes the washing machine, the processing on the substance is washing an item using the washing machine.

8. The information providing method according to claim 1, wherein when the household appliance includes the rice cooker, the processing on the substance is heating rice in the rice cooker.

9. The information providing method according to claim 1, wherein when the household appliance includes the refrigerator, the processing on the substance is cooling an item in the refrigerator.

10. A non-transitory computer-readable recording medium for use in a computer, the recording medium having a computer program recorded thereon for causing the computer to execute:

obtaining a use history of the at least one device used by a user for processing on a substance;

estimating a character tendency of the user based on the obtained use history without requiring input information input from the user regarding character tendency, the character tendency being a tendency of the user to perform an action involved in the processing on the substance; and providing information according to the estimated character tendency to the user by causing a display unit to display information according to the estimated tendency of the user, wherein the processing on the substance is a movement of the substance or a change in a temperature of the substance, the at least one device is used for housework and processing the substance through the user's use of the at least one device, the use history indicates substance amount information indicating an amount of the substance processed through the use of the at least one device, the at least one device includes a plurality of devices of different types, the plurality of devices includes different household appliances for performing different processing on the substance, the at least one device includes at least one of a vacuum cleaner, a washing machine, a rice cooker and a refrigerator, in the obtaining, respective use histories of the plurality of devices are obtained, and in the estimating, the character tendency of the user is estimated based on the obtained respective use histories, and the character tendency of the user is estimated from the use histories plotted in one of four quadrants, each of the quadrants indicating a different tendency of the user.

* * * * *